US010411839B2

(12) United States Patent
Guo et al.

(10) Patent No.: US 10,411,839 B2
(45) Date of Patent: Sep. 10, 2019

(54) METHOD AND APPARATUS FOR MANAGING COMMUNICATION WHEN A SERVING BEAM BECOMES INVALID IN A WIRELESS COMMUNICATION SYSTEM

(71) Applicant: ASUSTeK COMPUTER INC., Taipei (TW)

(72) Inventors: Yu-Hsuan Guo, Taipei (TW); Richard Lee-Chee Kuo, Taipei (TW); Meng-Hui Ou, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 78 days.

(21) Appl. No.: 15/637,362

(22) Filed: Jun. 29, 2017

(65) Prior Publication Data
US 2018/0006770 A1    Jan. 4, 2018

Related U.S. Application Data

(60) Provisional application No. 62/357,729, filed on Jul. 1, 2016.

(51) Int. Cl.
| | | |
|---|---|---|
| H04L 1/00 | (2006.01) | |
| H04L 1/18 | (2006.01) | |
| H04B 7/06 | (2006.01) | |
| H04B 7/08 | (2006.01) | |

(Continued)

(52) U.S. Cl.
CPC ......... *H04L 1/1835* (2013.01); *H04B 7/0617* (2013.01); *H04B 7/0695* (2013.01); *H04B 7/088* (2013.01); *H04L 1/189* (2013.01); *H04L 1/1822* (2013.01); *H04L 1/1864* (2013.01);

(Continued)

(58) Field of Classification Search
None
See application file for complete search history.

(56) References Cited

U.S. PATENT DOCUMENTS

| 10,230,447 B2 * | 3/2019 | Nagaraja ............ H04B 7/0617 |
|---|---|---|
| 2010/0195640 A1 | 8/2010 | Park et al. |
| 2012/0196645 A1 | 8/2012 | Kim et al. |

(Continued)

FOREIGN PATENT DOCUMENTS

| EP | 2645592 A1 | 10/2013 |
|---|---|---|
| JP | 2010050665 A | 3/2010 |
| KR | 20160075217 A | 6/2016 |

OTHER PUBLICATIONS

European Office Action for European Patent Application No. 171785645 dated May 29, 2018, 8 pages.

(Continued)

*Primary Examiner* — Daniel F. McMahon
(74) *Attorney, Agent, or Firm* — Cooper Legal Group, LLC

(57) ABSTRACT

In one example, user equipment (UE) maintains one or multiple serving beams, and uses a serving beam to perform an uplink (UL) transmission of data. The data is stored in an uplink hybrid automatic repeat request (UL HARQ) buffer. When there is a failure to track the one or multiple serving beams, a beam recovery procedure is initialized. After successful completion of the beam recovery procedure, the UE retransmits the data stored in the UL HARQ buffer. The UE prevents the data from being flushed from the UL HARQ buffer when the failure to track the one or multiple serving beams occurs, so that the data can be retransmitted.

20 Claims, 18 Drawing Sheets

(51) Int. Cl.
  *H04W 72/08* (2009.01)
  *H04W 16/28* (2009.01)
(52) U.S. Cl.
  CPC ........... *H04L 1/1896* (2013.01); *H04W 16/28* (2013.01); *H04W 72/085* (2013.01)

(56) References Cited

U.S. PATENT DOCUMENTS

| | | |
|---|---|---|
| 2013/0003533 A1 | 1/2013 | Barbieri et al. |
| 2013/0040684 A1 | 2/2013 | Yu et al. |
| 2014/0092784 A1* | 4/2014 | Khayrallah ........... H04L 1/1887 370/280 |
| 2014/0293770 A1 | 10/2014 | Liu et al. |
| 2015/0110036 A1* | 4/2015 | Zhang ................... H04W 72/08 370/329 |
| 2015/0181479 A1 | 6/2015 | Lin et al. |
| 2015/0382205 A1 | 12/2015 | Lee et al. |
| 2016/0183233 A1 | 6/2016 | Park |
| 2016/0192433 A1* | 6/2016 | Deenoo ............... H04W 72/046 370/329 |
| 2016/0353510 A1 | 12/2016 | Zhang et al. |

OTHER PUBLICATIONS

Japanese Office Action for Japanese Patent Application No. 2017-126953 dated Jul. 31, 2018, 6 pages (including English translation).
Samsung, "Use cases and RAN2 issues of beam tracking in a beamforming based high frequency NR," 3GPP TSG-RAN WG2, Meeting #94, May 2016, R2-163730, 6 pages.
Ericsson, "SI: Study on Latency reduction techniques for LTE," 3GPP TSG RAN Meeting #67, Mar. 2015, RP-150465, Shanghai, China, 8 pages.
"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.
"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.
"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.
"DL Channel Design for Shortened TTI", 3GPP TSG RAN WG1 #84bis, Apr. 2016, R1-163068, Qualcomm Incorporated, Busan, Korea, 7 pages.
"Beam Forming Impacts," 3GPP TSG-RAN WG2 Meeting #93bis, Apr. 2016, R2-162366, Nokia, Alcatel-Lucent Shanghai Bell, Dubrovnik, Croatia, 3 pages.
"Discussion on terminology of beamforming based high frequency NR," 3GPP TSG-RAN WG2 Meeting #94, May 2016, R2-163716, Samsung, Nanjing, China, 4 pages.
"Beam support in NR," 3GPP TSG RAN WG2 Meeting #93bis, Apr. 2016, R2-162709, Intel Corporation, Dubrovnik, Croatia, 4 pages.

"Active Mode Mobility in NR: SINR drops in higher frequencies," 3GPP TSG-RAN WG2 #93bis, Apr. 2016, R2-162762, Ericsson, Dubrovnik, Croatia, 4 pages.
"Radio Access Architecture and Interfaces," 3rd Generation Partnership Project, Technical Specification Group Radio Access Network, Study on New Radio Access Technology, 3GPP TR 38.801, Apr. 2106, V0.1.0, Release 14, 17 pages.
"Summary of email discussion [93bis#23][NR] Deployment scenarios," 3GPP TSG-RAN WG2 #94, May 2016, R2-164306, Revision of R2-163399, NTT Docomo, Inc., Nanjing, China, 18 pages.
"3GPP TDocs (written contributions) at meeting," Meeting: R2-94, May 2016, Nanjing, China, 38 pages. http://www.3gpp.org/DynaReport/TDocExMtg-R2-94-31668.htm.
"RAN2 Impacts in HF-NR," 3GPP TSG-RAN WG2 #94, May 2016, R2-163879, MediaTek Inc., Nanjing, China, 5 pages.
"Beam level management <—> Cell level mobility," 3GPP TSG-RAN WG2 Meeting #93bis, Apr. 2016, R2-162210, Samsung, Dubrovnik, Croatia, 4 pages.
"Cell concept in NR," 3GPP TSG RAN WG2 Meeting #94, May 2016, R2-163471, CATT, Nanjing, China, 4 pages.
"General considerations on LTE-NR tight interworking," 3GPP TSG-RAN WG2 Meeting #94, May 2016, R2-164270, Huawei, HiSilicon, Nanjing, China, 3 pages.
"RAN2 aspects of high frequency New RAT," 3GPP TSG-RAN WG2 Meeting #93bis, Apr. 2016, R2-162251, Samsung, Dubrovnik, Croatia, 8 pages.
"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.
"Mobility Supporting for HF-NR," 3GPP TSG-RAN WG2 #94, May 2016, R2-163484, MediaTek Inc., Nanjing, China, 6 pages.
"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall Description, 3GPP TS 36.300, Mar. 2016, V13.3.0, 295 pages.
"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.
"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.
Korean Office Action for Korean Patent Application No. 10-2017-0082461 dated Feb. 9, 2018, 11 pages (including English translation).
European Office Action for European Patent Application No. 171785645 dated Nov. 7, 2017, 12 pages.
"Evolved Universal Terrestrial Radio Access (E-UTRA) and Evolved Universal Terrestrial Radio Access Network (E-UTRAN)," 3rd Generation Partnership Project, Technical Specification Group Radio Access Network, 3GPP TS 36.300, Jun. 2016, V13.4.0, 310 pages.
Korean Office Action for Korean Patent Application No. 10-2017-0082461 dated Oct. 24, 2018, 12 pages (including English translation).
Taiwanese Office Action and Search Report for Taiwanese Patent Application No. 106121857 dated Dec. 17 2018, 11 pages.

\* cited by examiner

Different deployment scenarios with Single TRP cell

Different deployment scenarios with multiple TRPs Cell

METHOD AND APPARATUS FOR MANAGING COMMUNICATION WHEN A SERVING BEAM BECOMES INVALID IN A WIRELESS COMMUNICATION SYSTEM

CROSS-REFERENCE TO RELATED APPLICATIONS

This application claims priority to U.S. Provisional Patent Application Ser. No. 62/357,729, filed on Jul. 1, 2016, and entitled METHOD AND APPARATUS FOR HANDLING BEAM BECOMING INVALID IN A WIRELESS COMMUNICATION SYSTEM, the entirety of which is hereby incorporated by reference.

TECHNICAL FIELD

The subject disclosure is directed to wireless communications, and is more particularly related to handling communication between a user equipment (UE) (e.g. a mobile phone) and a network's transmission reception point (TRP) that may reside in a base station (BS).

BACKGROUND

The 3rd Generation Partnership Project (3GPP) is a group that is trying to investigate and develop technology components for the next generation access technology, namely 5G. 3GPP commenced its standardization activities vis-a-vis the 5G in March of 2015. 3GPP regularly publishes its meeting notes that describe its proposals, reference architecture models and study items for 5G. For example, 3GPP envisions a single cell architecture that contains multiple TRPs (also referred to as distributed units (DUs)) and supports intra-cell mobility of the UE as it travels among the TRPs. This architecture presents numerous challenges to which the inventions disclosed herein provide solutions.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the following terms can be referred to by the respective abbreviations: 3rd Generation Partnership Project (3GPP); 5th generation (5G); Block Error Rate (BER); Beam Specific Reference Signal (BRS); Base Station (BS); C-RAN (Cloud RAN); Connected State (CONN); Channel Quality Indicator (CQI); Channel State Information (CSI); Closed Subscriber Group (CSG); Central Unit (CU); Downlink (DL); Distributed Unit (DU); Evolved Node B (eNB or eNodeB); Evolved Universal Terrestrial Radio Access (E-UTRA); Frequency-Division Duplex (FDD); Global System for Mobile Communications (GSM); Hybrid Automatic Repeat Request (HARQ); Long Term Evolution (LTE); Medium Access Control (MAC); Multiple Input, Multiple Output (MIMO); Network Function Virtualization (NFV); New RAT (NR); Network (NW); Physical (PHY); Public Land Mobile Network (PLMN); Radio Access Technology (RAT); Radio Frequency (RF); Radio Resource Control (RRC); Reference Signal Receiving Power (RSRP); Reference Signal Receiving Quality (RSRQ); Reception (Rx); Signal to Interference Plus Noise Ratio (SINR); Semi-Persistent Scheduling (SPS); Tracking Area (TA); Tracking Area Code (TAC); Tracking Area Identity (TAI); Transmission/Reception Point (TRP); TRP Group (TRPG); Technical Specification (TS); Transmission (Tx); User Equipment (UE); and Universal Terrestrial Radio Access (UTRA).

In various non-limiting embodiments, by way of example, the disclosed subject matter provides a method for a user equipment (UE) or a mobile device that initiates a beam recovery procedure when at least one serving beam becomes invalid, and after successful completion of the beam recovery procedure performs an uplink (UL) retransmission of data stored in an uplink hybrid automatic repeat request (UL HARQ) buffer.

In a further non-limiting example, the beam recovery procedure comprises transmitting a scheduling request. In a further non-limiting example, the beam recovery procedure is initiated due to beam tracking failure. In a further non-limiting example, the beam tracking failure is detected when the at least one serving beam is determined to have become invalid (e.g. the UE or mobile device does not receive a signal or an indication via the at least one serving beam for a predetermined amount of time or before a counter reaches a preset value). Beam tracking is a process to track valid serving beam(s) for the UE. Beam tracking can be performed by the UE via monitoring a signal of a serving cell of the UE which can differentiate between different beams of the serving cell. Beam tracking may be performed by the UE via receiving an indication from the TRP or network about which serving beam can be used for transmission and/or reception. Beam tracking failure may be detected when the UE considers or determines that a serving beam has become invalid, that all serving beams have become invalid, every serving beam for a serving TRP has become invalid, or every serving beam of every serving TRP has become invalid. Beam tracking failure may be detected when the UE considers its (configured) UE beam(s) to have become invalid.

In a further non-limiting example, the UE or mobile device performs a UL transmission of the data stored in the UL HARQ buffer before the beam recovery procedure. In a further non-limiting example, the UL transmission is via a beam of the at least one serving beam. In a further non-limiting example, the uplink retransmission of data occurs via a new beam as an alternative to the at least one serving beam. In a further non-limiting example, the new beam is found during the beam recovery procedure. In a further non-limiting example, the UE or mobile device does not flush the UL HARQ buffer in response to the beam tracking failure. In a further non-limiting example, the UE or mobile device triggers a power headroom report in response to the detection of the beam tracking failure or the successful completion of the beam recovery procedure.

In addition, further example implementations are directed to systems, devices and/or other articles of manufacture that facilitate the data retransmission when a serving beam in a wireless communication system becomes invalid, as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION

The 5G technology aims to support the following three families of usage scenarios, and specifically to satisfy both urgent market needs and more long-term requirements set forth by the ITU-R IMT-2020: (i) eMBB (enhanced Mobile Broadband), (ii) mMTC (massive Machine Type Communications) and (iii) URLLC (Ultra-Reliable and Low Latency Communications). An objective of 3GPP's 5G study item on new radio access technology is to identify and develop technology components for new radio systems that can operate in any spectrum band ranging from low frequencies to at least 100 GHz. However, radio systems that try to support high carrier frequencies (e.g. up to 100 GHz) will encounter a number of challenges in the area of radio propagation. For example, with increasing carrier frequency, the path loss would also increase.

According to R2-162366 (3GPP TSG-RAN WG2 Meeting #93bis), in lower frequency bands (e.g. in current Long Term Evolution (LTE) bands <6 GHz), the required cell coverage is provided by forming a wide sector beam for transmitting downlink common channels. However, utilizing wide sector beam on higher frequencies (>>6 GHz) is problematic in that the cell coverage is reduced for the same antenna gain. Thus, in order to provide the required cell coverage on higher frequency bands, higher antenna gain is needed to compensate for the increased path loss. To increase the antenna gain over a wide sector beam, larger antenna arrays, where the number of antenna elements range from tens to hundreds, are used to form high gain beams. As a consequence, the high gain beams are formed narrower than a typical wide sector beam, and so multiple high gain beams are needed for transmitting downlink common channels to cover the required cell area. The number of concurrent high gain beams that an access point is able to form is limited by the cost and complexity of the utilized transceiver architecture. In practice, for higher frequencies, the number of concurrent high gain beams is much less than the total number of beams required to cover the cell area. In other words, the access point is able to cover only a portion of the cell area by using a subset of beams at any given time.

Figure 1:
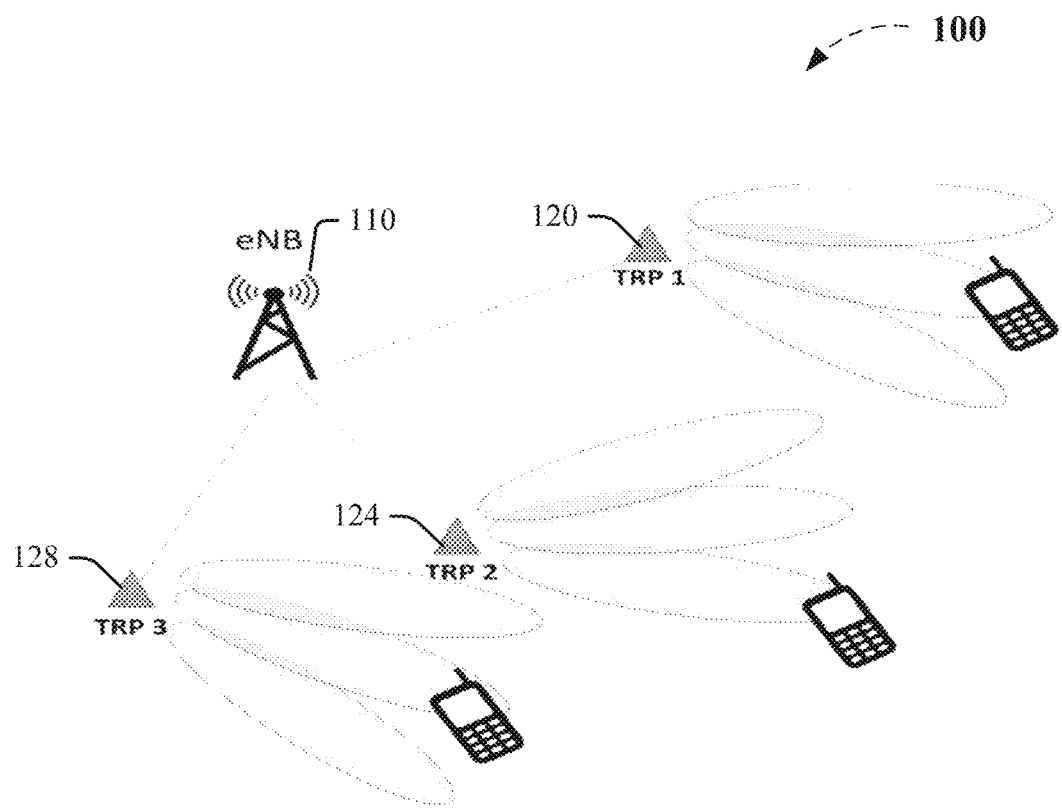
FIG. 1 illustrates the beam concept in 5G, where each TRP is generating multiple narrow beams, for example, as part of beam sweeping.

According to R2-163716 (3GPP TSG-RAN WG2 Meeting #94), beamforming is a signal processing technique used in antenna arrays for directional signal transmission/reception. In beamforming, a beam is be formed by combining elements in a phased array of antennas in such a way that signals at particular angles experience constructive interference while others experience destructive interference. Different beams are formed simultaneously using multiple arrays of antennas. According to R2-162709 (3GPP TSG RAN WG2 Meeting #93bis) and as shown in FIG. 1, the 5G cell 100 includes an evolved Node B (eNB) 110 communicably coupled to multiple transmission/reception points (TRPs) 120, 124 and 128, which can be either centralized or distributed. Each TRP 120, 124 or 128 can and is shown to form multiple beams. The number of beams formed by the TRP 120, 124 or 128 and the number of simultaneous beams in the time/frequency domain depend on the number of antenna array elements and the radio frequency RF being utilized by the TRP 120, 124 or 128.

Potential mobility types for the new radio access technology (NR) include intra-TRP mobility, inter-TRP mobility and inter-NR eNB mobility. According to R2-162762 (TSG RAN WG2 Meeting #93bis), the reliability of a system purely relying on beamforming and operating at higher frequencies is subject to challenges. A reason being that the coverage of such a system is more sensitive to both time and space variations. As a consequence, the signal to interference plus noise ratio (SINR) of its link (which is narrower than LTE) can drop much quicker than in the case of LTE.

In the 5G systems, fairly regular grid-of-beams coverage patterns with tens or hundreds of candidates for serving beams per node can be created, by using antenna arrays having hundreds of elements at access nodes. However, the coverage area of an individual serving beam from such an array would be small, down to the order of some tens of meters in width. As a consequence, channel quality degradation outside a currently-in-use serving beam's area would happen quicker than in the case of wide area coverage (e.g. as provided by LTE).

Figure 2:
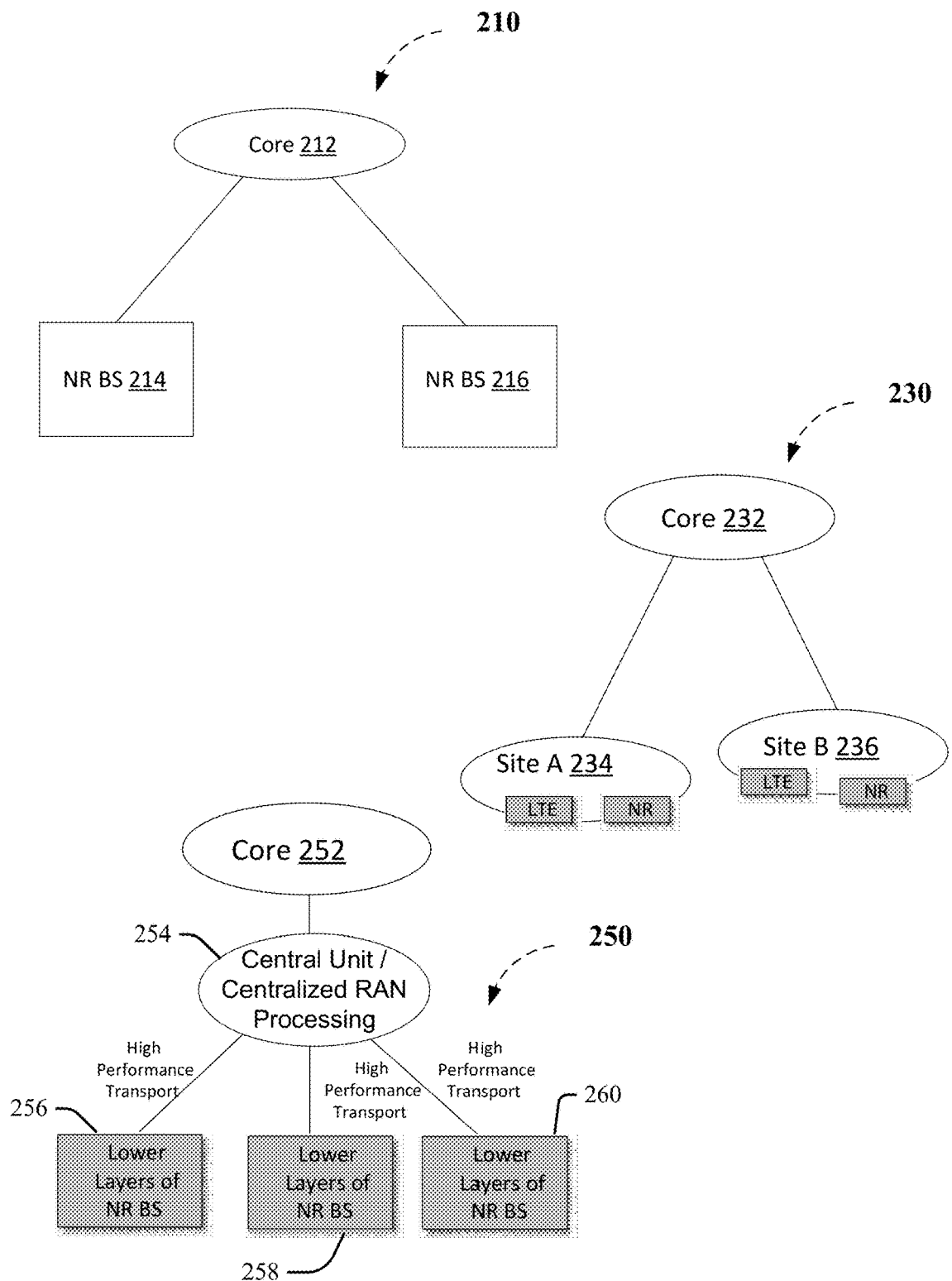
FIG. 2 illustrates exemplary radio network architectures that the 3GPP desires to support with NR including, for example, stand-alone, co-sited with LTE and centralized baseband architectures.
Figure 3:
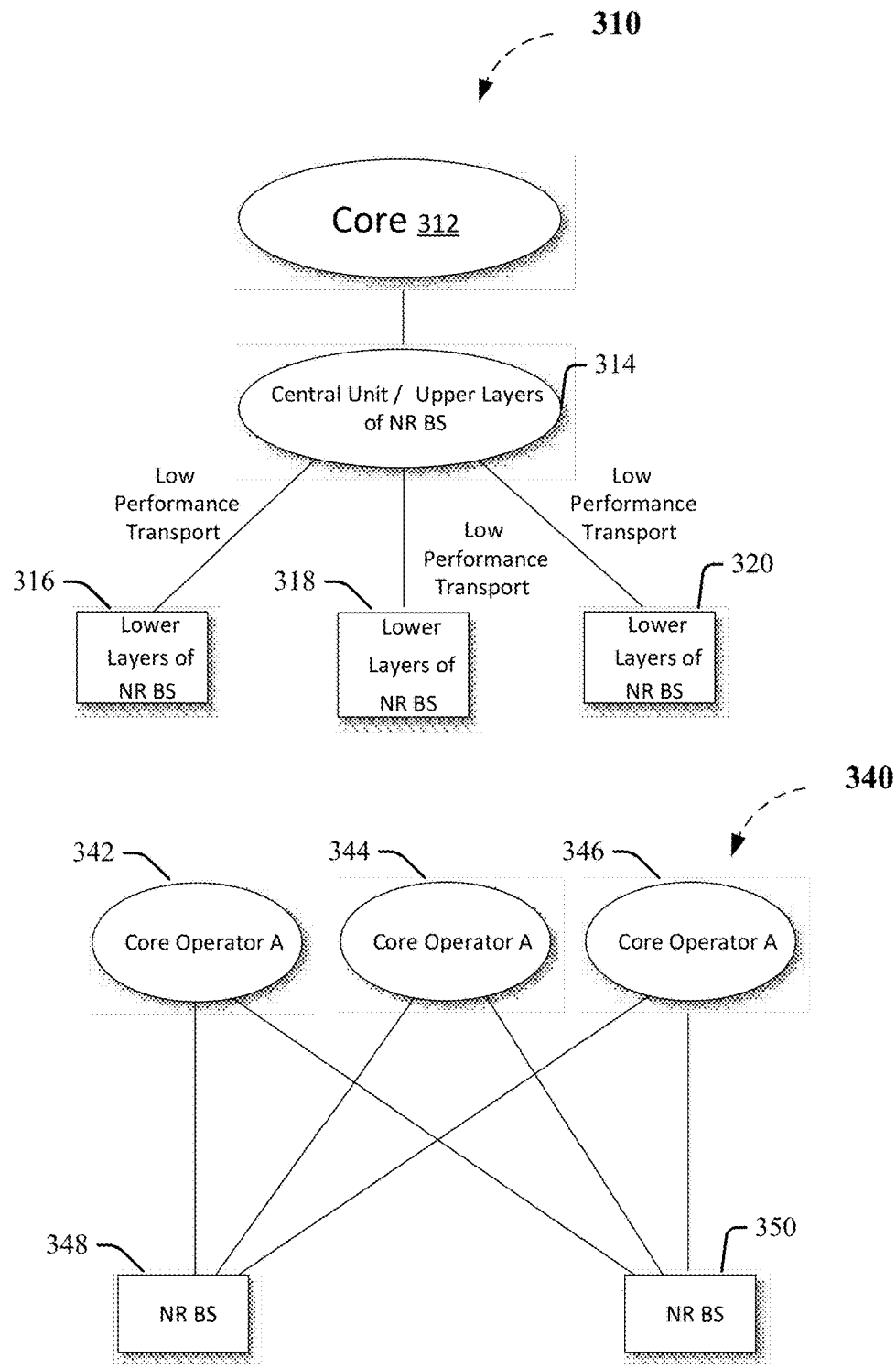
FIG. 3 illustrates more exemplary radio network architectures that the 3GPP desires to support with NR including, for example, centralized with low performance transport and shared RAN.

According to R3-160947 (3GPP TR 38.801 V0.1.0 (2016-04)), the scenarios illustrated in FIGS. 2 and 3 show exemplary radio network architectures that the 3GPP desires to support with the NR. FIG. 2 illustrates three example network architectures 210, 230 and 250. In the network architecture 210, the core network 212 is shown communicably coupled to two NR base stations 214 and 216.

In the network architecture 230, the core network 232 is communicably coupled to Sites A 234 and Site B 236, wherein those sites support both NR and LTE functionality. In network architecture 250, the core network 252 is communicably coupled to a central baseband unit 254, which serves as the central unit of the architecture 252 and performs centralized radio access network (RAN) processing. The central baseband unit 254, in turn, is communicably coupled to the lower layers of the NR base stations 256, 258 and 260 by way of high performance transport links.

FIG. 3 illustrates two more example radio network architectures 310 and 340 that the 3GPP desires to support with NR. In architecture 310, the core network 312 is communicably coupled to the central unit 314 that includes the upper layers of the NR base station. The central unit 314, in turn, is communicably coupled to the lower layers of the NR base stations 316, 318 and 320 via low performance transport links. In architecture 340, each core network operator 342, 344 and 346 is communicably coupled to both the NR base stations 348 and 350.

According to R2-164306 (3GPP TSG-RAN WG2 #94), the 3GPP desires to study the deployments of cell layouts for standalone NR in macro cells, heterogeneous cells and small cells. According to 3GPP TSG-RAN WG2 #94 meeting minutes for the May 23-26, 2016 meeting, one NR eNB corresponds to one or many TRPs. Typically, network controlled mobility involves two levels. In one level, the mobility control is driven by the RRC at the cell level. In the other level, there is zero or minimum involvement by the RRC (e.g. at MAC/PHY layers). According to R2-162210 (3GPP TSG-RAN WG2 Meeting #93bis), 3GPP desires to keep the principle of 2-level mobility handling in NR. One level would include cell level mobility and the other level would include beam level mobility management. Regarding cell level mobility, the cell selection or reselection occurs when the UE (or mobile device) is in IDLE state and the handover occurs when the UE or mobile device is in connected (CONN) state. The mobility control is driven by the RRC in the CONN state. Regarding beam level management, layer 1 (L1 or physical layer) handles appropriate selection of the TRP to be used by a UE (or a mobile device) and also handles the optimal beam direction.

5G systems are expected to rely heavily on "beam based mobility" to handle UE mobility, in addition to relying the conventional handover based UE mobility. Technologies like MIMO, fronthauling, C-RAN and NFV will allow the coverage area controlled by a single 5G node to grow, thus increasing the possible applications for beam level management and reducing the need for cell level mobility. All mobility within the coverage area of one 5G node could be handled based on beam level management. In that scenario, handovers would only occur in case of UE mobility from the coverage area of one 5G node to the coverage area of another 5G node.

Figure 4:
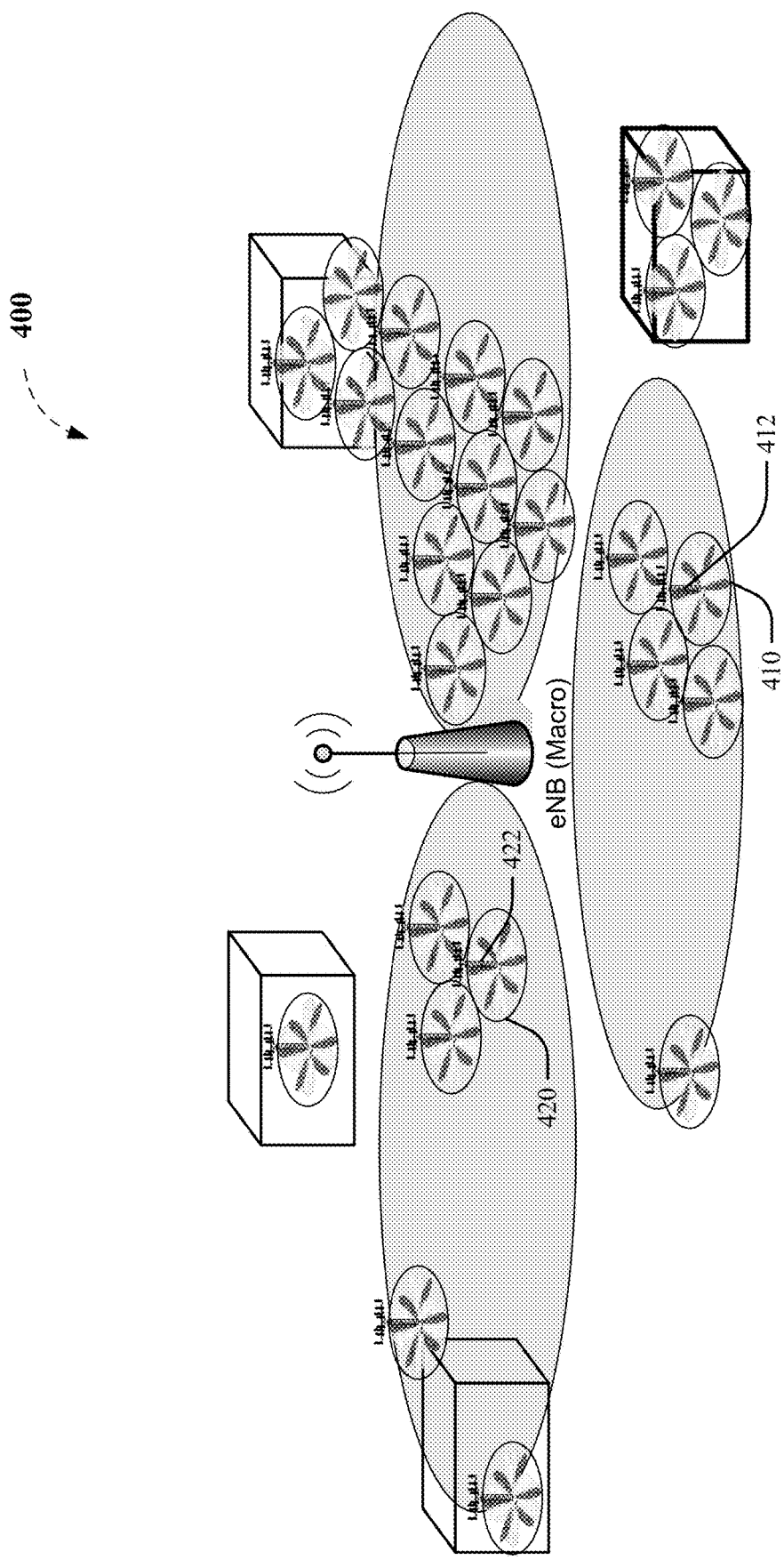
FIG. 4 illustrates various example deployment scenarios for arrangement of cells having a single TRP.
Figure 5:
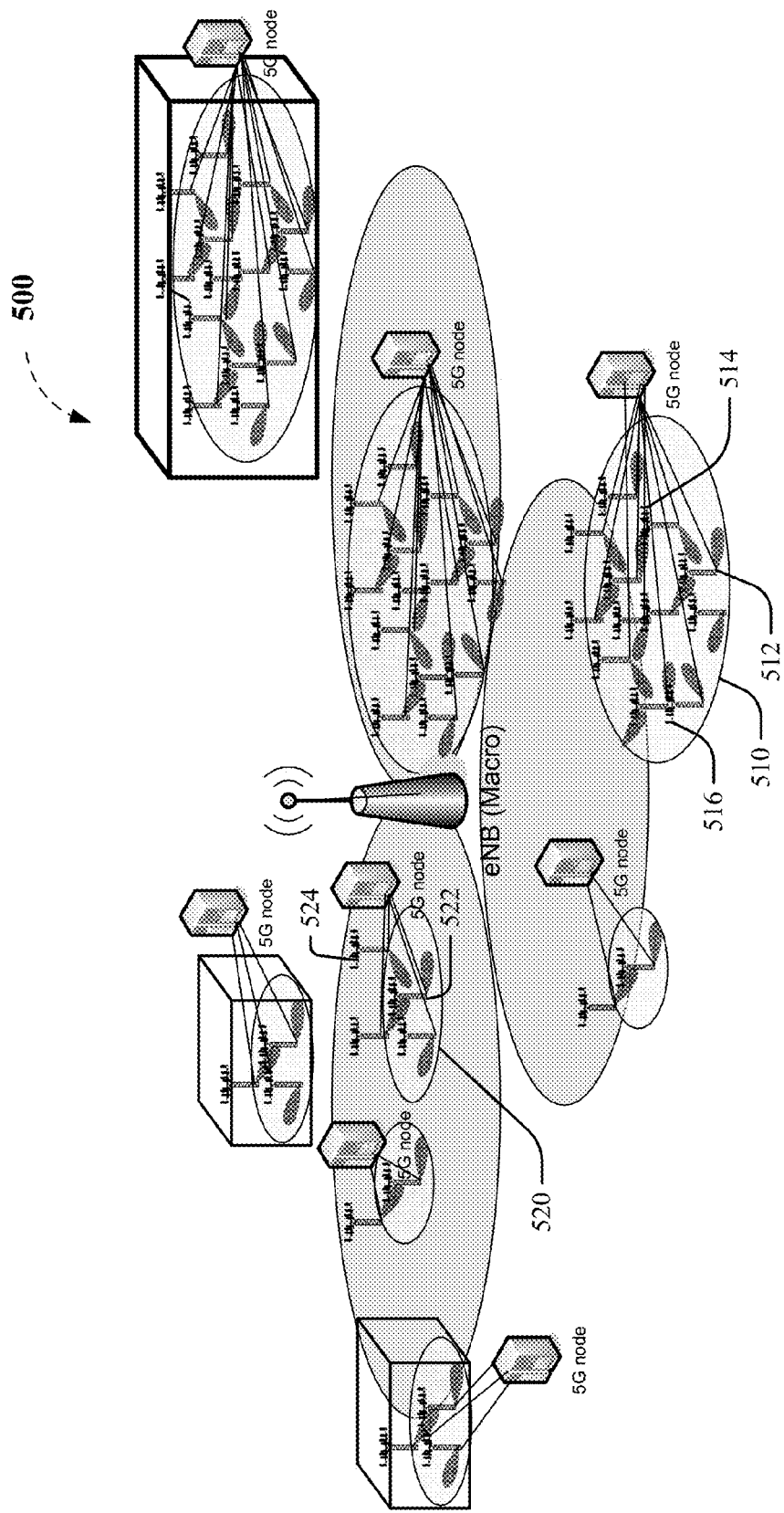
FIG. 5 illustrates various example deployment scenarios for arrangement of cells having multiple TRPs.
Figure 6:
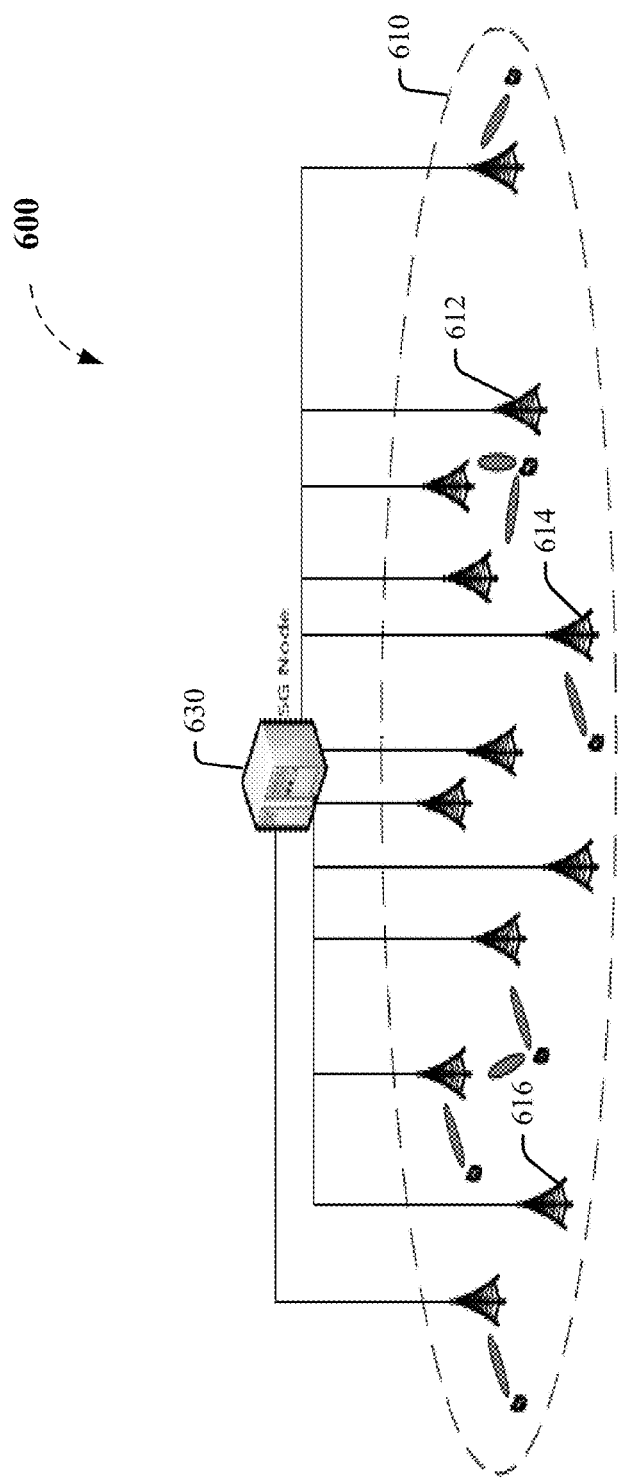
FIG. 6 illustrates an example 5G cell.
Figure 7:
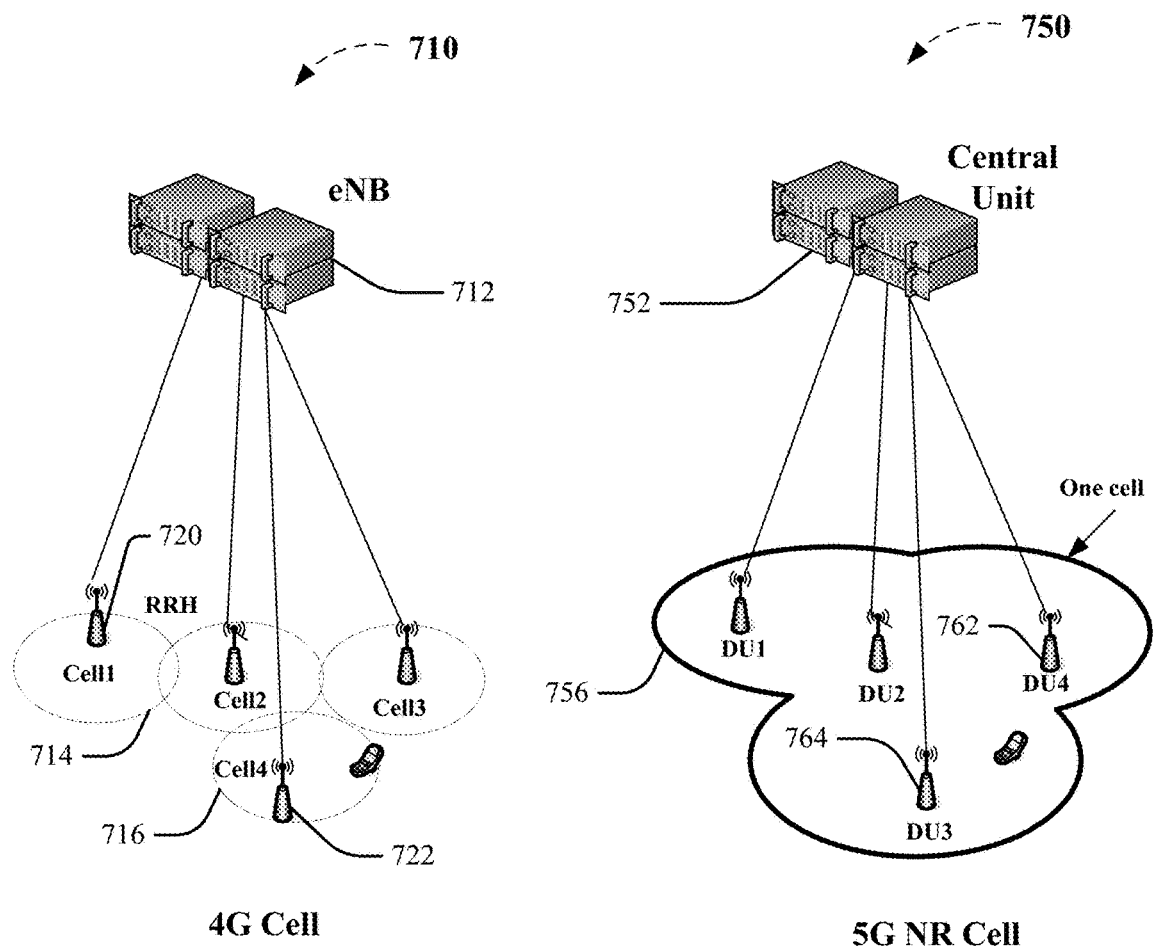
FIG. 7 illustrates side-by-side comparison between an example 4G cell and an example 5G cell.

FIGS. 4, 5, 6 and 7 show some examples of cell design in 5G NR. FIG. 4 shows an example deployment with a single-TRP cell. The deployment 400 includes numerous cells having a single TRP, for example cell 410 includes TRP 412 and cell 420 includes TRP 422. Some cells are clustered together and others are isolated. FIG. 5 shows an example deployment with multiple-TRP cells. The deployment 500 includes a cell 510 having multiple TRPs 512, 514 and 516. The deployment 500 also includes a cell 520 having TRPs 522 and 524. FIG. 6 shows an example deployment 600 having one 5G cell 610 comprising a 5G node 630 and multiple TRPs 612, 614 and 616. FIG. 7 shows a comparison between a LTE cell 710 and a 5G NR cell 750. The LTE cell 710 includes an eNB 712 communicably coupled to multiple cells 714 and 716. Cell 714 is shown to include TRP 720 and cell 716 is shown to include TRP 722. The NR cell 750 includes a centralized unit 752 communicably coupled to a single-cell 756. The single-cell 756 includes multiple distributed units (DU) 762 and 764. It will be understood that apart from performing a handover based on Radio Research Management (RRM) measurement, 3GPP desires that a 5G UE should be able to adapt the serving beam to maintain 5G connectivity even in case of beam quality fluctuation and/or UE intra-cell mobility. However, in order to do that, 5G Node-B and UE must be able to track and change the serving beam properly (referred to as beam tracking hereafter).

Some terminology and assumption are specified in the following and may be used hereafter. The term base station (BS), as used in the subject disclosure, refers to a network central unit in the NR that is used to control one or multiple TRPs associated with one or multiple cells. Communication between BS and TRP(s) can occur via a fronthaul connection. A BS could also be referred to as central unit (CU), eNB, or NodeB. A TRP, as used herein, is a transmission and reception point that provides network coverage and directly communicates with UEs. A TRP could also be referred to as a distributed unit (DU). A cell, as used herein, is composed of one or multiple associated TRPs, i.e. the coverage of the cell is a superset of the coverage of all the individual TRP(s) associated with the cell. One cell is controlled by one BS. A cell can also be referred to as a TRP group (TRPG). Beam sweeping is used to cover all possible directions (360 degrees) for transmission and/or reception. For beam sweeping, numerous beams are required. As it is not possible to generate all these beams concurrently, beam sweeping means generation of a subset of these beams in one time interval and generation of different subsets of beam(s) in other time interval(s). Stated differently, beam sweeping means changing beams in time domain, such that all possible directions are covered after several time intervals. Beam sweeping number refers to the necessary number of time interval(s) needed to sweep beams in all possible directions once for transmission and/or reception. The control/instruction signaling related to beam sweeping would include a "beam sweeping number". The beam sweeping number indicates the number of times during a predetermined time period that various different subsets of beams must be generated to cover the desired area.

On the network side, a NR using beamforming could be standalone, meaning that the UE can directly camp on or connect to NR. Also, a NR using beamforming and a NR not using beamforming can coexist, for example, in different cells. A TRP can apply beamforming to both data and control signaling transmissions and receptions, if possible and beneficial. The number of beams generated concurrently by a TRP depends on the TRP's capability. For example, the maximum number of beams generated concurrently by different TRPs in the same cell may be the same and those in different cells may be different. Beam sweeping is necessary, e.g. for the control signaling to be provided in every direction. In various embodiments, downlink timing of TRPs in the same cell are synchronized and the RRC layer of the network side is located in the BS. The TRP should support both UEs with UE beamforming and UEs without UE beamforming, meaning that the TRP should support UEs of different capabilities and support UE designs based on different UE releases.

On the UE side, a UE may perform beamforming for reception and/or transmission, if possible and beneficial. The number of beams generated concurrently by a UE would depend on the UE's capability, for example, depending on whether generating more than one beam is possible for the UE. Beam(s) generated by a UE are typically wider than beam(s) generated by a eNB. Beam sweeping for transmission and/or reception is generally not necessary for user data but could be necessary for other signaling, for example, to perform a measurement. It is to be appreciated that not every UE supports UE beamforming, for example, due to UE capability or because UE beamforming was not supported by NR's first few release(s). One UE can to be served by multiple beams from one or multiple TRPs of the same cell. Same or different DL data could be transmitted on the same radio resource via different serving beams for diversity or throughput gain. There are at least two UE (RRC) states: connected state (or called active state) and non-connected state (or called inactive state or idle state).

Figure 8:
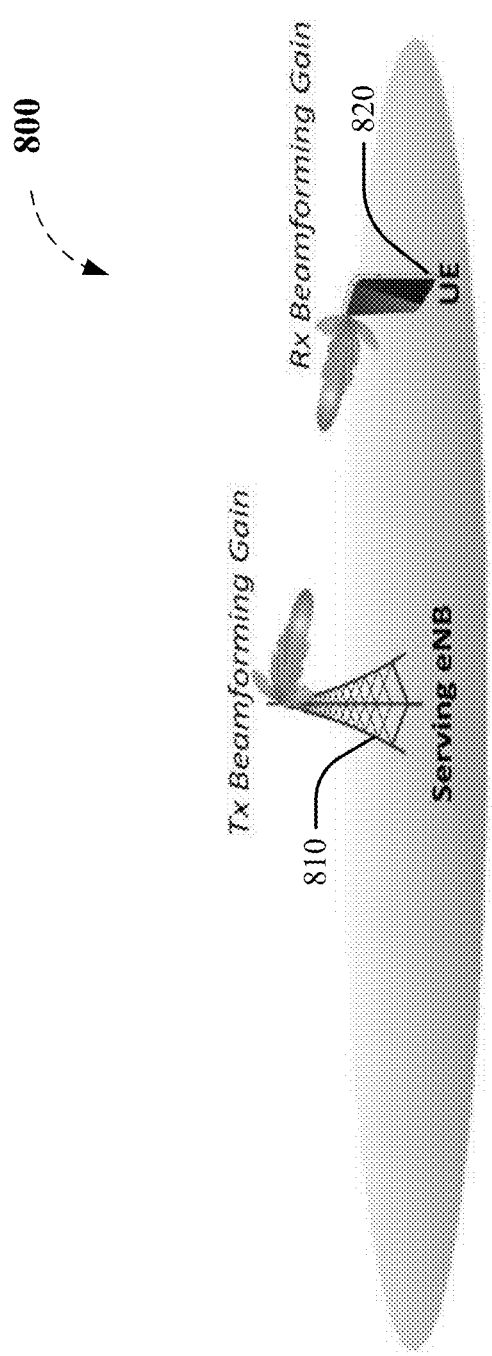
FIG. 8 illustrates an example high frequency HF-NR system that facilitates gain compensation by beamforming.

According to R2-162251 (3GPP TSG-RAN WG2 Meeting #92bis), beamforming can be performed on both eNB and UE sides. FIG. 8 illustrates the concept of gain compensation by beamforming in a high frequency (HF) NR system. In the example cell 800, beamforming is performed by both the eNB 810 and the UE 820. In one practical example, 3GGP expects the beamforming antenna gain at the eNB 810 to be about 15 to 30 dBi and the expected beamforming antenna gain at the UE 820 to be about 3 to 20 dBi.

Figure 9:
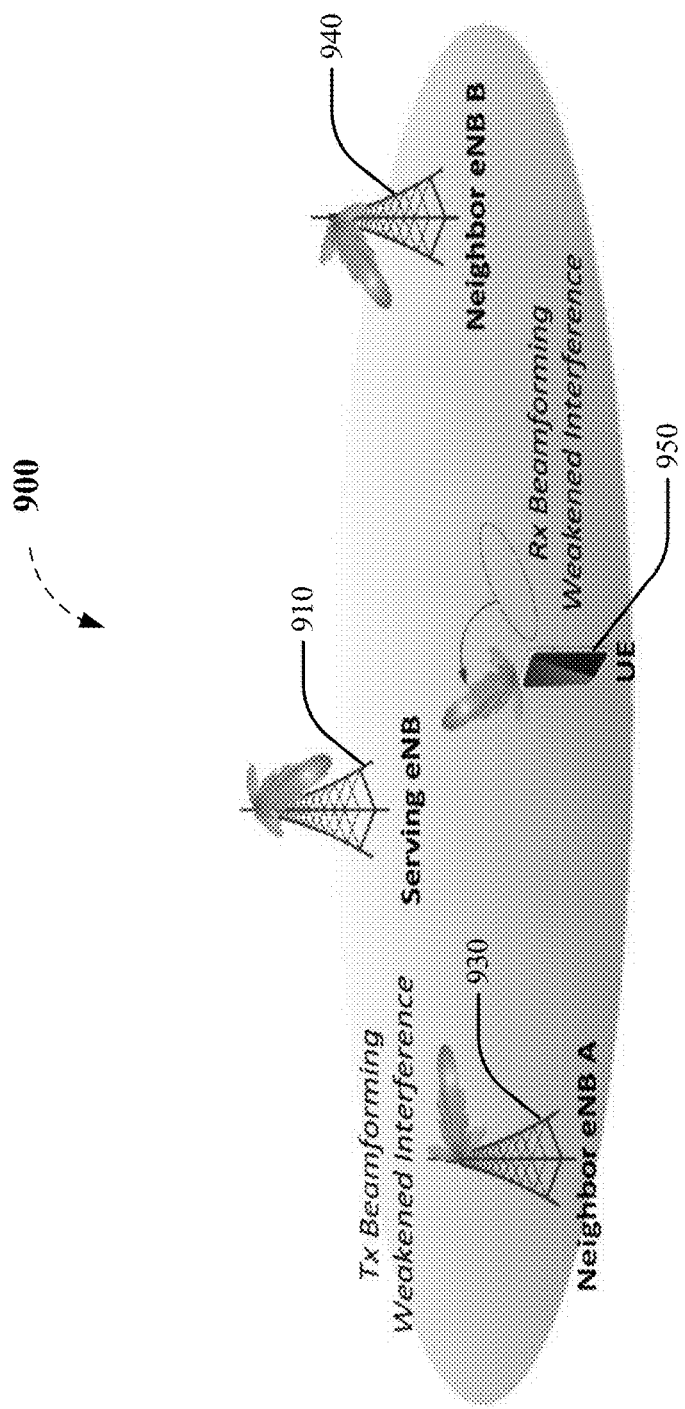
FIG. 9 illustrates an example HF-NR system that facilitates weakened interference by beamforming.

From SINR perspective, FIG. 9 illustrates a cell 900 in which interference is weakened because of beamforming. Sharp beamforming reduces interference power at the serving eNB 910 from neighboring interferers eNB A 930 and eNB B 940, for example, during a downlink operation. Interference power from UEs connected to neighboring eNBs 930, 940 is also reduced because of beamforming. It is to be understood and appreciated that in a TX beamforming case, effective interference will be caused only by other TXs whose current beam(s) are also pointed in the direction of the RX. Effective interference means that the interference power is higher than the effective noise power. In a RX beamforming case, effective interference will be caused only by other TXs whose beam(s) are pointed in the same direction as the UE's 950 current RX beam direction.

Mobility in connected state without cell change is specified in the following. When the UE is in a connected state, the UE may move among different beams or TRPs of the same serving cell. Besides, if UE beamforming is used, UE beam(s) may also change over time, e.g. due to UE rotation. An example of mobility in a connected state without cell change may have the following steps:

Signaling for change detection: Change of UE beam(s), serving beam(s) of serving TRP(s), and serving TRP(s) may be detected by UE and/or network. In order to detect the change, a signaling periodically transmitted by TRP(s) or UE could be used. TRP(s) periodically perform beam sweeping for reception or transmission of the signaling. If UE beamforming is used, UE periodically performs beam sweeping for reception or transmission of the signaling.

UE beam change: If the change is detected by UE, UE itself may select proper UE beam(s) for the following reception (and transmission, e.g. for TDD). Alternatively, UE needs to provide feedback to network and network could provide an indication of UE beam change from network to UE. If the change is detected by network, indication of UE beam change from network to UE may be required. UE uses UE beam(s) indicated by network for the following transmission (and reception, e.g. for TDD).

Serving beam and/or serving TRP change: After UE receives the signaling for change detection, UE needs to provide feedback to network and network could decide whether to change (DL) serving beam(s) and/or serving TRP(s) for the UE. On the other hand, after TRP(s) receive the signaling for change detection, network could decide whether to change serving beam(s) and/or serving TRP(s) for the UE.

Figure 10:
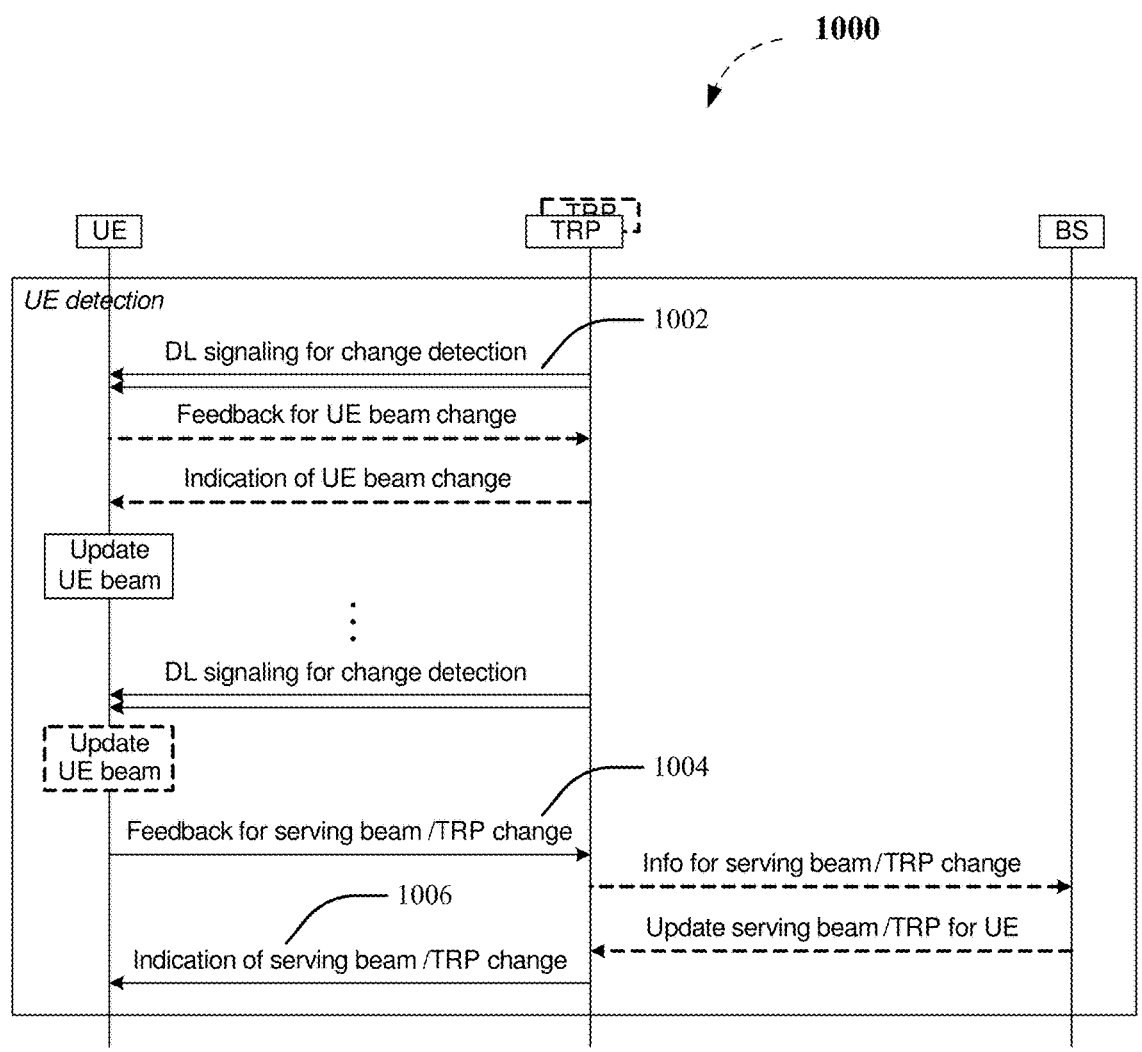
FIG. 10 illustrates an example methodology for managing UE mobility in connected state without cell change (based on UE detection)
Figure 11:
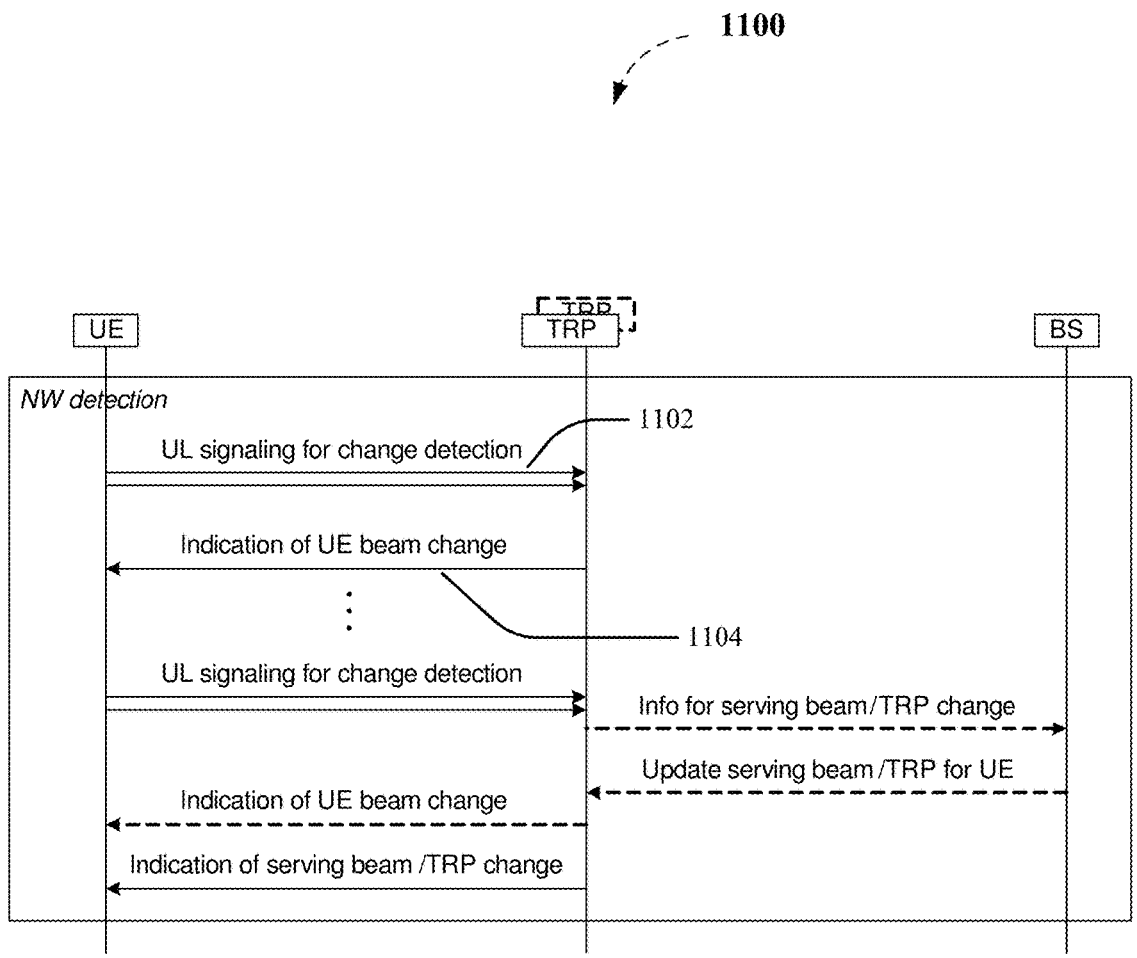
FIG. 11 illustrates an example methodology for managing UE mobility in connected state without cell change (based on network detection)

FIGS. 10 and 11 illustrate examples of flow charts for mobility in connected state without cell change. Flow chart 1000 in FIG. 10 illustrates mobility based on UE detection. According to some of the steps illustrated in the flow chart 1000, the UE detects a beam or TRP change based on DL signaling received from the network (1002). The UE may provide feedback to the network (1004), for example, about a proper beam that should be used, and the UE receives an indication from the network acknowledging the feedback (1006). Flow chart 1100 in FIG. 11 illustrates mobility based on network detection. According to some of the steps illustrated in the flow chart 1100, the network detects a beam change based on UL signaling received from the UE (1102), and the network sends an indication to the UE acknowledging the beam change (1104).

Beam tracking is specified in the following. It is to be understood and appreciated that a 5G UE is expected be able to adapt to the serving beam, which subject to variations caused by beam quality fluctuation or the UE's intra-cell mobility, and maintain 5G connectivity. To adapt, 5G Node-B and UE must be able to track the serving beam and when needed, communicate with the network to change the serving beam properly. About beam tracking, according to R2-162226 (3GPP TSG RAN WG2 #93bis), the beam tracking procedure consists of BRS measurement, beam feedback, beam recovery and beam alignment. BRS measurement involves measurement for selecting the serving beam for a serving cell by comparing beam qualities or various candidate beams. Beam feedback involves delivering the UE beam's information to the 5G Node-B. The 5G Node-B uses that information for proper serving beam (re)selection. About beam feedback, compared to RRM measurement and report, which has a relatively longer time scale, the beam feedback must have sufficiently short periodicity with proper filtering to track available beams. Since the available beams may be dynamically changed due to UE's intra-cell mobility, the proper periodicity should be decided accordingly. The beam feedback procedure can be supported by both physical and/or medium access layers.

A beam recovery procedure is important because even with the periodic beam feedback, sudden beam quality degradation may incur failure of the beam tracking procedure. When the serving beam of a UE becomes unavailable, there will be a high probability that an alternative beam would be found, unless the UE is out-of-coverage of the serving cell. To recover the serving beam before releasing RRC connection, a 5G system should support fast beam recovery procedure that can be triggered by feedback failure. About beam alignment, beam alignment is needed because if the serving beam is conditioned to be changed by the beam feedback/recovery procedure, it is essential for the 5G Node-B and the UE to have the same understanding as to when and how the control channels would be scheduled for the changed beam.

According to R2-163484 (3GPP TSG-RAN WG2 #94), beam administration is performed by the lower layers, i.e. PHY/MAC, to meet the restrict latency requirement, especially when the UE is in high mobility status. The beam administration procedure consists of an initial beam alignment, beam switching/tracking and beam recovery. Initial beam alignment is used to perform initial establishment of beamforming parameters at both BS and UE for subsequent communication. The UE performs beam search based on the reference signals. Beam switching/tracking is used for finer beam adjustment and maintenance after initial beam alignment. Both network and UE keep monitoring the channel quality of both the serving beams and the non-serving beams. When qualities of current serving beams degrade, other beams with better quality are acquired for connectivity maintenance. Beam recovery is used to recover the beam when beam switching/tracking fails. UE initiates a new round of beam alignment to assist with beam recovery.

If a beam tracking failure is detected by the network instead of a UE, beam recovery may not be done promptly if the UE cannot receive a request from the network to perform recovery procedure. So, not only the network side but also the UE side should be able and responsible to detect beam tracking failure in order to complete beam recovery as soon as possible. According to various embodiments and aspects of the subject disclosure, the UE can implement specific actions upon detecting beam tracking failure or detecting that a serving beam has become invalid. If beam tracking failure is detected by the UE, that can mean that the network beam(s) utilized by the network are different from the serving beam(s) assumed (or expected to receive) by the UE. Alternatively, or additionally, that can mean that the UE beam(s) utilized by the UE are different from those assumed (or expected to receive) by the network. In case of such mismatch and misunderstanding between the network and the UE, the UE operation will be adversely impacted. For example, UE's functionalities or procedures can fail. Also, subsequent UL transmission(s) that follow the serving beam invalidation can fail and may interfere with UL transmission(s) from other UE(s).

To avoid unnecessary UE power consumption and interference with other UL transmissions, in one example, the specific action that the UE can take is to suspend or terminate ongoing UL retransmission(s) associated with the failure. In another example, the specific action can include suspending UL new transmission(s) associated with the failure. In yet another example, the specific action can include terminating the UL new transmission(s) associated with the failure.

To suspend UL's new transmission(s), the UE can stop using associated configured UL resources, e.g. SPS uplink grant. To suspend UL retransmission(s), the UE can prohibit non-adaptive retransmission(s). In one embodiment, the associated UL HARQ buffer is not flushed, and the data therein is kept intact for a future retransmission. The retransmission is performed, or the retransmission is resumed, when the beam recovery procedure is successfully completed. The associated UL HARQ buffer doesn't need to be flushed to suspend transmission(s). To terminate UL (re) transmission(s), there can be several possible alternatives and specific actions including flushing the associated UL HARQ buffer, discarding associated configured UL resources (for example, SPS uplink grant), resetting the associated HARQ entity and/or resetting the associated MAC entity. Information of serving beam(s) and/or serving TRP(s) stored in the UE can be discarded or invalidated. Considering that the serving beam(s) and/or serving TRP(s) may possibly be changed, the UE can assume that the associated uplink timing advance is not valid anymore (for example, stop the associated time alignment timer); and/or assume that the associated uplink transmission power is not valid anymore (for example, use default power). The UE can disable or suspend the associated discontinuous reception (DRX) functionality or stop timer(s) related to the associated DRX functionality in order to keep monitoring DL signaling, and recover as soon as possible.

Upon detecting beam tracking failure, the UE can initiate beam recovery procedure by itself when beam tracking failure is detected by the UE. The beam recovery procedure can be, for example, random access procedure, UL reference signal transmission, scheduling request transmission, aperiodic channel quality report, or the like. The UE can perform UE beam sweeping during the beam recovery procedure. The UE can trigger and/or report an associated power headroom report in response to beam becoming invalid, beam tracking failure, successful beam recovery, UE beam change, serving beam change, and/or serving TRP change.

Beam tracking can be a process to track valid serving beam(s) for the UE. Beam tracking may be performed by the UE via monitoring a signal of a serving cell of the UE which can differentiate different beams of the serving cell. Beam tracking may be performed by the UE via receiving an indication about which serving beam can be used for transmission and/or reception.

Beam tracking failure may be detected when the UE considers a serving beam has become invalid, all serving beams have become invalid, every serving beam for a serving TRP has become invalid, or every serving beam of every serving TRP has become invalid. Beam tracking failure may also be detected when the UE considers its (configured) UE beam(s) have become invalid.

Similar handling of the situation can also be implemented when a beam becomes invalid for the UE. In one example, the beam is a network beam serving the UE. In another example, the beam is the last serving beam of a TRP for the UE. In another example, the beam is a UE beam. The corresponding action to be performed in response to beam becoming invalid can be associated with the beam. For example, the UE can stop an UL transmission via the beam, suspend an UL transmission via the beam, or terminate an UL transmission via the beam. In one example, one of these actions may be taken if there is no valid serving beam associated with a TRP anymore, wherein the TRP is the same TRP for which the serving beam became invalid. Also, in one example, that no action may not be taken if there is still at least one valid serving beam associated with the TRP after the beam becomes invalid.

A beam becoming invalid can be detected by beam tracking. A beam becoming invalid can be determined to have been detected when the UE considers a transmission or a reception to have failed. A beam becoming invalid can be determined to have been detected when a timer has expired, or a counter reaches a specific value, e.g. a maximum value. The timer or the counter may be associated with the transmission, the reception, or the beam tracking. A beam becoming invalid may be determined to have been detected if a signal or an indication via the beam is not received by the UE, e.g. for a predetermined period of time. The signal refers to the signal that contains information for differentiating between different beams of the serving cell, for example, based on a beam specific reference signal (BRS). The signal or the indication can be used to determine which beam can be used for transmission/reception. A beam becoming invalid can be determined to have been detected due to UE beam change or TRP change. In one example, the UE doesn't perform serving cell change in response to the beam becoming invalid.

Figure 12:
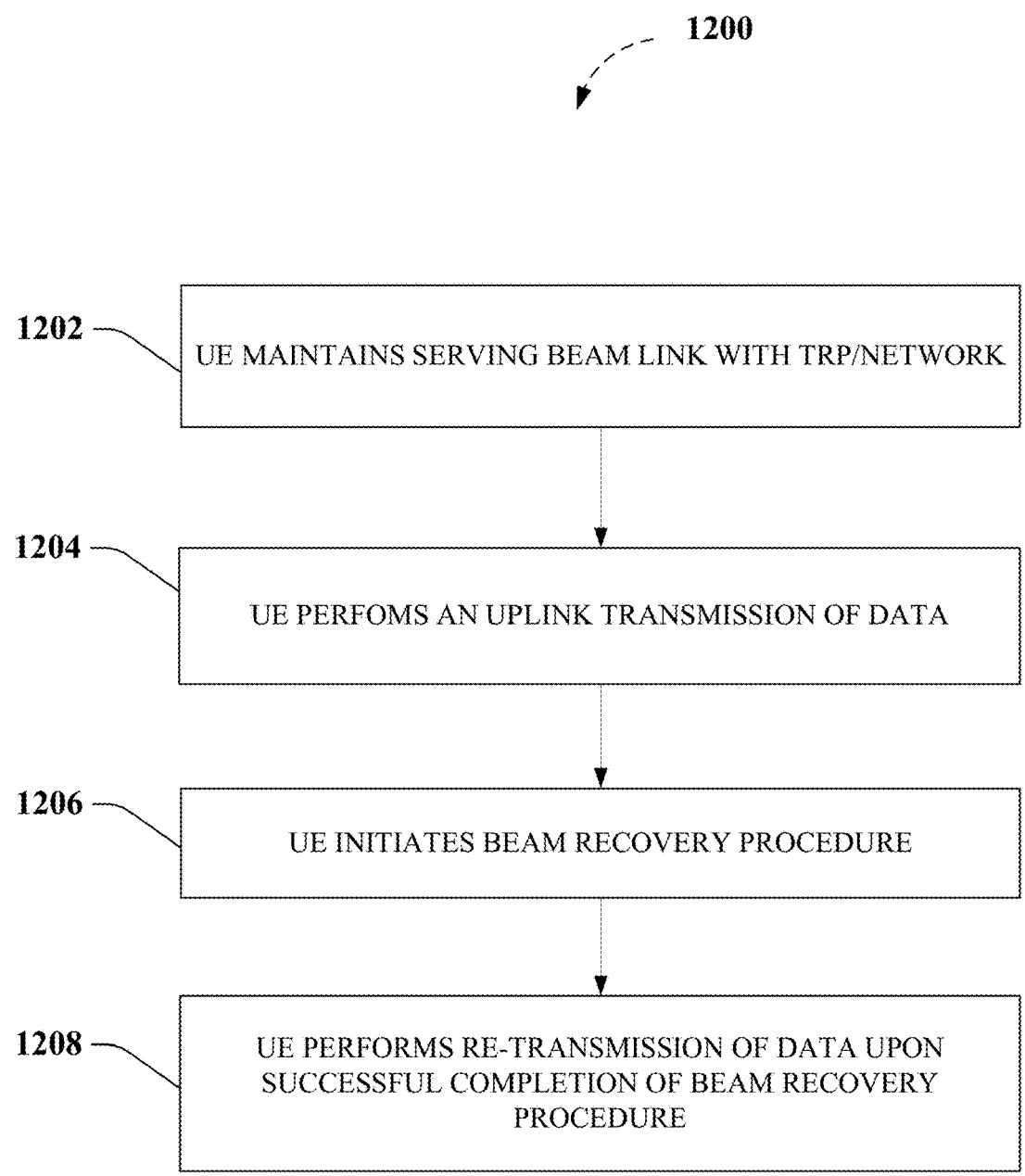
FIG. 12 illustrates an example methodology for UE operation when a serving beam becomes invalid.

FIG. 12 illustrates an example methodology of a UE after a serving beam being used becomes invalid. At Step 1202 of the flow diagram 1200, the UE maintains (at least) a serving beam. At Step 1204, the UE performs an UL transmission of data stored in a UL HARQ buffer. At Step 1206, the UE initiates a beam recovery procedure. At Step 1208, the UE retransmits the data stored in the UL HARQ buffer after the completion of the beam recovery procedure.

In one embodiment, the beam recovery procedure comprises transmitting a scheduling request. The beam recovery procedure is initiated in response to a beam tracking failure. The beam tracking failure is detected if the serving beam is determined to have become invalid. The serving beam is determined to have become invalid if the UE does not receive a signal or an indication via the serving beam within a predetermined period of time. Alternatively or additionally, the serving beam is determined to have become invalid if a timer expires or a counter reaching a predetermined value (e.g. the UE does not receive a signal or an indication via the serving beam prior to the expiration of the timer or the counter reaching the predetermined value). The UE does not flush the UL HARQ buffer in response to the occurrence of the beam tracking failure. In other words, the UE prevents the flushing of the UL HARQ buffer in response to the occurrence of the beam tracking failure. The UE triggers a power headroom report in response to the occurrence of the beam tracking failure or the successful completion of the beam recovery procedure. The UL transmission is via the serving beam. The retransmission is made via a new beam, e.g. a beam different from any of the serving beam. The new beam is found during the beam recovery procedure.

In response to detection of a beam becoming invalid, the UE can stop, suspend, or terminate a UL transmission, e.g. via the beam becoming invalid. The UL transmission may be a new transmission or a retransmission. The transmission may be resumed when a recovery procedure, e.g. beam recovery procedure, is completed successfully.

In response to detection of a beam becoming invalid, the UE can discard or stop using a configured UL resource, e.g. SPS uplink grant. The configured UL resource may be associated with the UL transmission, e.g. via the beam becoming invalid.

In response to detection of a beam becoming invalid, the UE can prohibit non-adaptive retransmission(s). The transmission may be resumed when a recovery procedure, e.g. beam recovery procedure, is completed successfully.

In response to detection of a beam becoming invalid, the UL HARQ buffer associated with the retransmissions may not be flushed. Alternatively, in response to detection of a beam becoming invalid, the UE can flush UL HARQ buffer associated with the UL transmission, e.g. via the beam becoming invalid.

In response to detection of a beam becoming invalid, the UE can reset HARQ entity or MAC entity associated with the UL transmission, e.g. via the beam becoming invalid.

In response to detection of a beam becoming invalid, the UE can discard or invalidate a TRP associated with the beam becoming invalid, e.g. if there is no valid serving beam associated with the TRP anymore.

In response to detection of a beam becoming invalid, the UE can consider uplink timing advance associated with the beam is not valid anymore. The UE may stop a time alignment timer associated with the beam becoming invalid.

In response to detection of a beam becoming invalid, the UE can consider uplink transmission power associated with the beam is not valid anymore. The UE may use a default power.

In response to detection of a beam becoming invalid, the UE can disable or suspend DRX functionality associated with the beam becoming invalid. Alternatively or additionally, the UE may stop one or multiple timers related to DRX functionality associated with the beam becoming invalid. The timer may be DRX inactivity timer or on duration timer.

In response to detection of a beam becoming invalid, the UE can initiate a beam recovery procedure. The beam recovery procedure may comprise a random access procedure, a UL reference signal transmission, scheduling request transmission, and or aperiodic channel quality report. The UE may perform UE beam sweeping during the beam recovery procedure.

In response to detection of a beam becoming invalid, the UE can trigger a power headroom report.

The above actions in response to detection of a beam becoming invalid can be performed if there is no valid serving beam associated with a TRP anymore, wherein the TRP is associated with the beam becoming invalid. Alternatively, the above actions in response to detection of a beam becoming invalid can be performed if there is still at least one valid serving beam associated with a TRP after the beam becoming invalid, wherein the TRP is associated with the beam becoming invalid.

The beam becoming invalid can be detected by beam tracking. The beam becoming invalid can be considered as beam tracking failure. Alternatively or additionally, the beam becoming invalid may be detected when the UE considers a transmission or a reception is failed. Alternatively or additionally, the beam becoming invalid may be detected when a timer is expired or a counter reaches a specific value, e.g. a maximum value. The timer or the counter may be associated with a transmission, a reception, or the beam tracking. Alternatively or additionally, the beam becoming invalid may be detected if a signal or an indication via the beam is not received by the UE, e.g. for a period of time. The beam becoming invalid may be due to beam change or TRP change.

Beam tracking can be a process to track valid serving beam(s) for the UE. Beam tracking may be performed by the UE via monitoring a signal of a serving cell of the UE which can differentiate different beam of the serving cell. Alternatively, beam tracking may be performed by the UE via receiving an indication about which serving beam can be used for transmission and/or reception.

Beam tracking failure may be detected when the UE considers its serving beam(s) becomes invalid, or when the UE considers its (configured) UE beam(s) becomes invalid. The UE may not perform serving cell change in response to the beam becoming invalid. The beam may be a network beam serving the UE, a UE beam, or the last serving beam of a TRP for the UE. The UE may be a connected mode UE.

The methodologies discussed above with reference to FIG. 12 enable a UE to avoid unnecessary transmission, provide power consumption savings to the UE and/or enable a UE to promptly recover from a beam tracking failure.

Various embodiments of the subject disclosure described herein can be applied to or implemented in exemplary wireless communication systems and devices described below. In addition, various embodiments of the subject disclosure are described mainly in the context of the 3GPP architecture reference model. However, it is understood that with the disclosed information, one skilled in the art could easily adapt for use and implement aspects of the subject disclosure in a 3GPP2 network architecture as well as in other network architectures, as further described herein.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio) wireless access for 5G, or some other modulation techniques.

Figure 13:
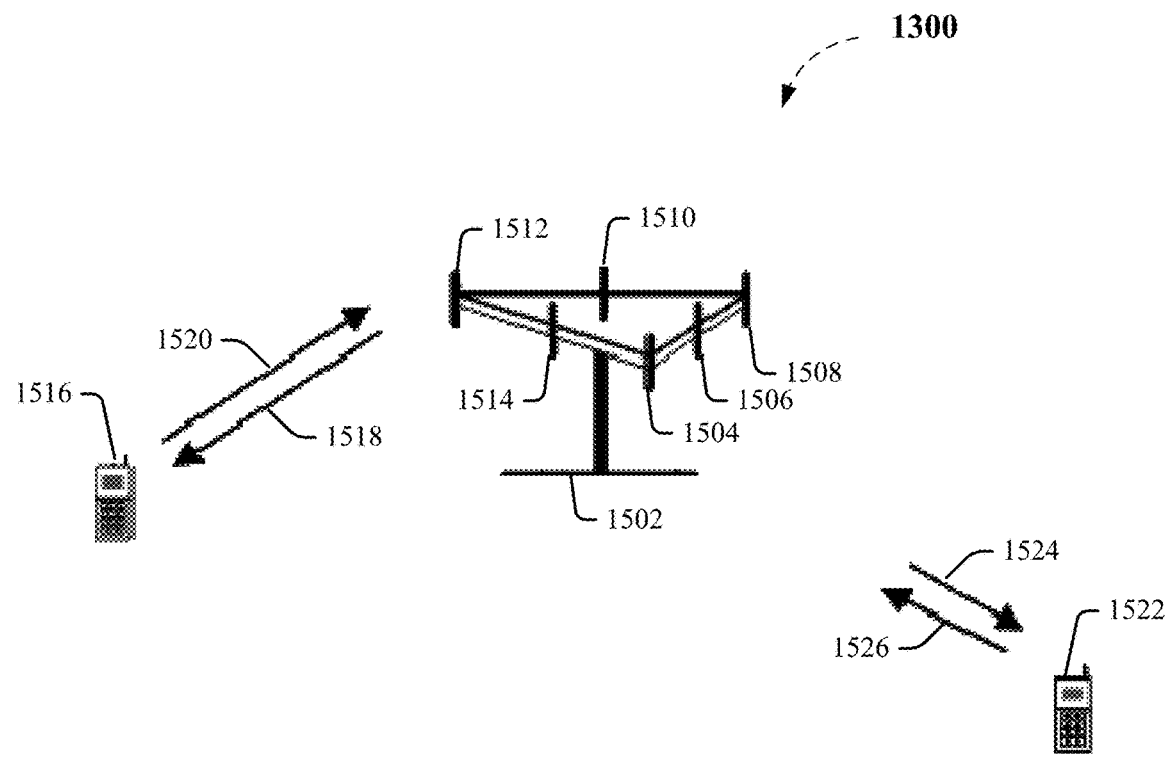
FIG. 13 illustrates and example multiple access wireless communication system in which various embodiments directed to managing an invalid serving beam can be implemented.

FIG. 13 is a block diagram representing an exemplary non-limiting multiple access wireless communication system 1300 in which various embodiments described herein can be implemented. An access network 1302 (AN) includes multiple antenna groups, one group including antennas 1304 and 1306, another group including antennas 1308 and 1310, and an additional group including antennas 1312 and 1314. In FIG. 13, only two antennas are shown for each antenna group, however, more or fewer antennas may be utilized for each antenna group. Access terminal 1316 (AT) is in communication with antennas 1312 and 1314, where antennas 1312 and 1314 transmit information to access terminal 1316 over forward link 1318 and receive information from access terminal 1316 over reverse link 1320. Access terminal (AT) 1322 is in communication with antennas 1306 and 1308, where antennas 1306 and 1308 transmit information to access terminal (AT) 1322 over forward link 1324 and receive information from access terminal (AT) 1322 over reverse link 1326. In a Frequency Division Duplex (FDD) system, communication links 1318, 1320, 1324 and 1326 may use different frequency for communication. For example, forward link 1318 may use a different frequency than that used by reverse link 1320.

Each group of antennas and/or the area in which they are designed to communicate is often referred to as a sector of the access network. In non-limiting aspects, antenna groups each can be designed to communicate to access terminals in a sector of the areas covered by access network 1302.

In communication over forward links 1318 and 1324, the transmitting antennas of access network 1302 may utilize beamforming in order to improve the signal-to-noise ratio of forward links for the different access terminals 1316 and 1322. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a communication device, a wireless communication device, a mobile device, a mobile communication device, a terminal, an access terminal or some other terminology.

Figure 14:
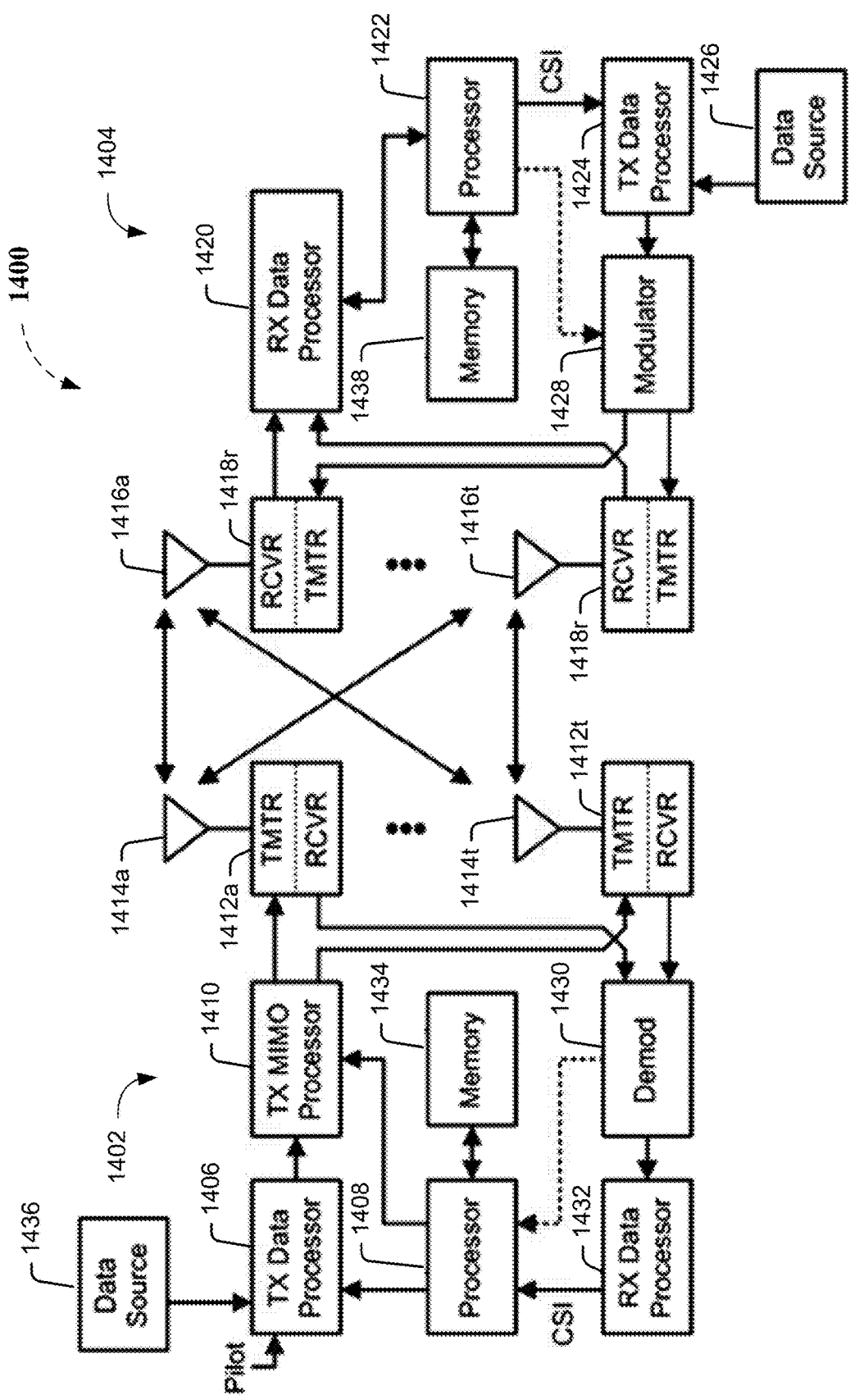
FIG. 14 illustrates a simplified block diagram of an example MIMO system depicting an example embodiment of a transmitter system (also referred to herein as an access network) and a receiver system (also referred to herein as an access terminal (AT) or user equipment (UE)), suitable for incorporation of various aspects directed to various networks, TRPs and UEs described herein.

FIG. 14 is a simplified block diagram of an exemplary non-limiting MIMO system 1400 depicting an exemplary embodiment of a transmitter system 1402 (also referred to herein as the access network) and a receiver system 1404 (also referred to herein as an access terminal (AT) or user equipment (UE)), suitable for incorporation of various aspects directed to sTTIs described herein.

In a non-limiting aspect, each data stream can be transmitted over a respective transmit antenna. Exemplary TX data processor 1406 can format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system 1404 to estimate the channel response. The multiplexed pilot and coded data for each data stream is then modulated (e.g., symbol mapped) based on a particular modulation scheme (e.g., binary phase-shift keying (BPSK), quadrature phase shift keying (QPSK), M-ary or higher-order PSK (M-PSK), or M-ary quadrature amplitude modulation (M-QAM), etc.) selected for that data stream to provide modulation symbols. The data rate, coding, and modulation for each data stream may be determined by instructions performed by processor 1408.

The modulation symbols for all data streams are then provided to a TX MIMO processor 1410, which may further process the modulation symbols (e.g., for OFDM). TX MIMO processor 1410 then provides multiple (NT) modulation symbol streams to NT transmitters (TMTR) 1412a through 1412t. In certain embodiments, TX MIMO processor 1410 applies beamforming weights to the symbols of the data streams and to the antenna from which the symbol is being transmitted.

Each transmitter 1412 receives and processes a respective symbol stream to provide one or more analog signals, and further conditions (e.g., amplifies, filters, and upconverts, etc.) the analog signals to provide a modulated signal suitable for transmission over the MIMO channel. NT modulated signals from transmitters 1412a through 1412t are then transmitted from NT antennas 1414a through 1414t, respectively.

At receiver system 1404, the transmitted modulated signals are received by multiple (NR) antennas 1416a through 1416r and the received signal from each antenna 1416 is provided to a respective receiver (RCVR) 1418a through 1418r. Each receiver 1418 conditions (e.g., filters, amplifies, and downconverts, etc.) a respective received signal, digitizes the conditioned signal to provide samples, and further processes the samples to provide a corresponding "received" symbol stream.

A RX data processor 1420 then receives and processes the NR received symbol streams from NR receivers 1418 based on a particular receiver processing technique to provide NT "detected" symbol streams. The RX data processor 1420 then demodulates, deinterleaves, and decodes each detected symbol stream to recover the traffic data for the data stream. The processing by RX data processor 1420 is complementary to that performed by TX MIMO processor 1410 and TX data processor 1406 at transmitter system 1402.

A processor 1422 periodically determines which precoding matrix to use, for example, as further described herein. Processor 1422 formulates a reverse link message comprising a matrix index portion and a rank value portion.

The reverse link message may comprise various types of information regarding the communication link and/or the received data stream. The reverse link message is then processed by a TX data processor 1424, which also receives traffic data for a number of data streams from a data source 1426, modulated by a modulator 1428, conditioned by transmitters 1418a through 1418r, and transmitted back to transmitter system 1402.

At transmitter system 1402, the modulated signals from receiver system 1404 are received by antennas 1414, conditioned by receivers 1412, demodulated by a demodulator 1430, and processed by a RX data processor 1432 to extract the reserve link message transmitted by the receiver system 1404. Processor 1408 then determines which pre-coding matrix to use for determining the beamforming weights then processes the extracted message.

Memory 1434 may be used to temporarily store some buffered/computational data from 1430 or 1432 through Processor 1408, store some buffed data from data source 1436, or store some specific program codes, for example, as further described herein, for example, regarding FIGS. 10-12. Likewise, memory 1438 may be used to temporarily store some buffered/computational data from RX data processor 1420 through processor 1422, store some buffed data from data source 1426, or store some specific program codes, for example, as further described herein, for example, regarding FIGS. 10-12.

In view of the example embodiments described supra, devices and systems that can be implemented in accordance with the disclosed subject matter will be better appreciated with reference to the diagrams of FIGS. 10-12. While for purposes of simplicity of explanation, the example devices and systems are shown and described as a collection of blocks, it is to be understood and appreciated that the claimed subject matter is not limited by the order, arrangement, and/or number of the blocks, as some blocks may occur in different orders, arrangements, and/or combined and/or distributed with other blocks or functionality associated therewith from what is depicted and described herein. Moreover, not all illustrated blocks may be required to implement the example devices and systems described hereinafter. Additionally, it should be further understood that the example devices and systems and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program product accessible from any computer-readable device or media such as a tangible computer readable storage medium.

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

It can be further understood that while a brief overview of example systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Figure 15:
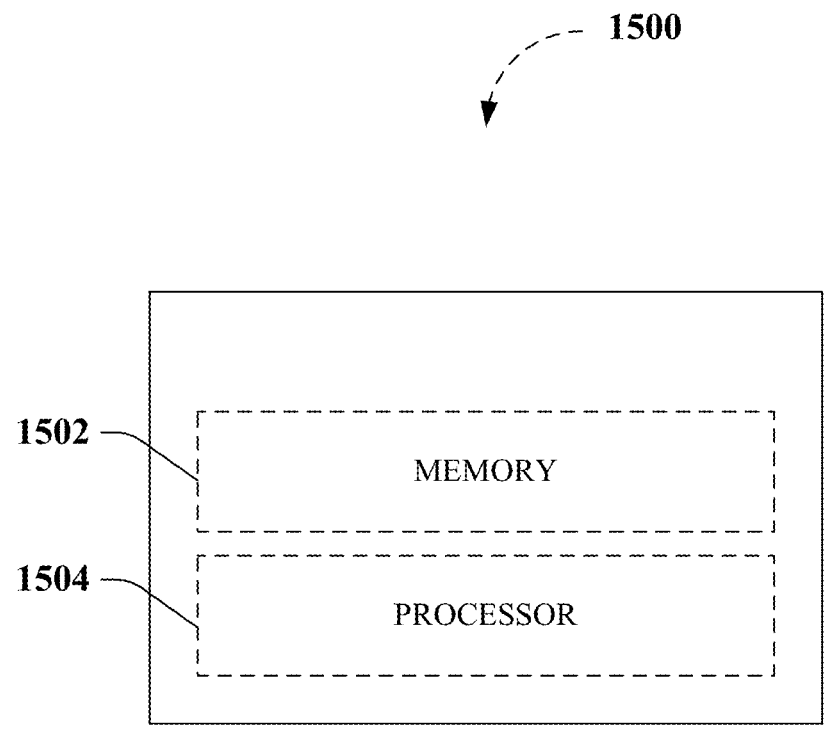
FIG. 15 depicts an example non-limiting device or system suitable for performing various aspects of the disclosed subject matter.

FIG. 15 illustrates an example non-limiting device or system 1500 suitable for performing various aspects of the disclosed subject matter. The device or system 1500 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 1500 can comprise example any of the devices and/or systems illustrated in FIGS. 1-14, as described above, or as further described below regarding FIGS. 16-18, for example, or portions thereof. For example, FIG. 15 depicts an example device 1500, which can be the UE device 1316 or 1322. In another non-limiting example, FIG. 15 depicts an example device 1500, which be can an access network 1302, eNB 110 or a TRP 120, 124 or 128. The device 1500 can be configured to perform beam management as illustrated in FIGS. 10-12 and related description. The device or system 1500 can comprise a memory 1502 that retains computer-executable instructions on a tangible computer readable storage medium and those instructions can be executed by the processor 1504. By way of the example, the UE 1500 can establish and maintain a serving beam with a TRP, initiate a change of serving beam when the quality of the serving beam degrades, and initiate a change of TRP when the UE 1500 is involved in intra-cell mobility. The UE 1500 can also initiate a beam recovery procedure and retransmit data from a UL HARQ buffer upon completion of the beam recovery procedure.

Figure 16:
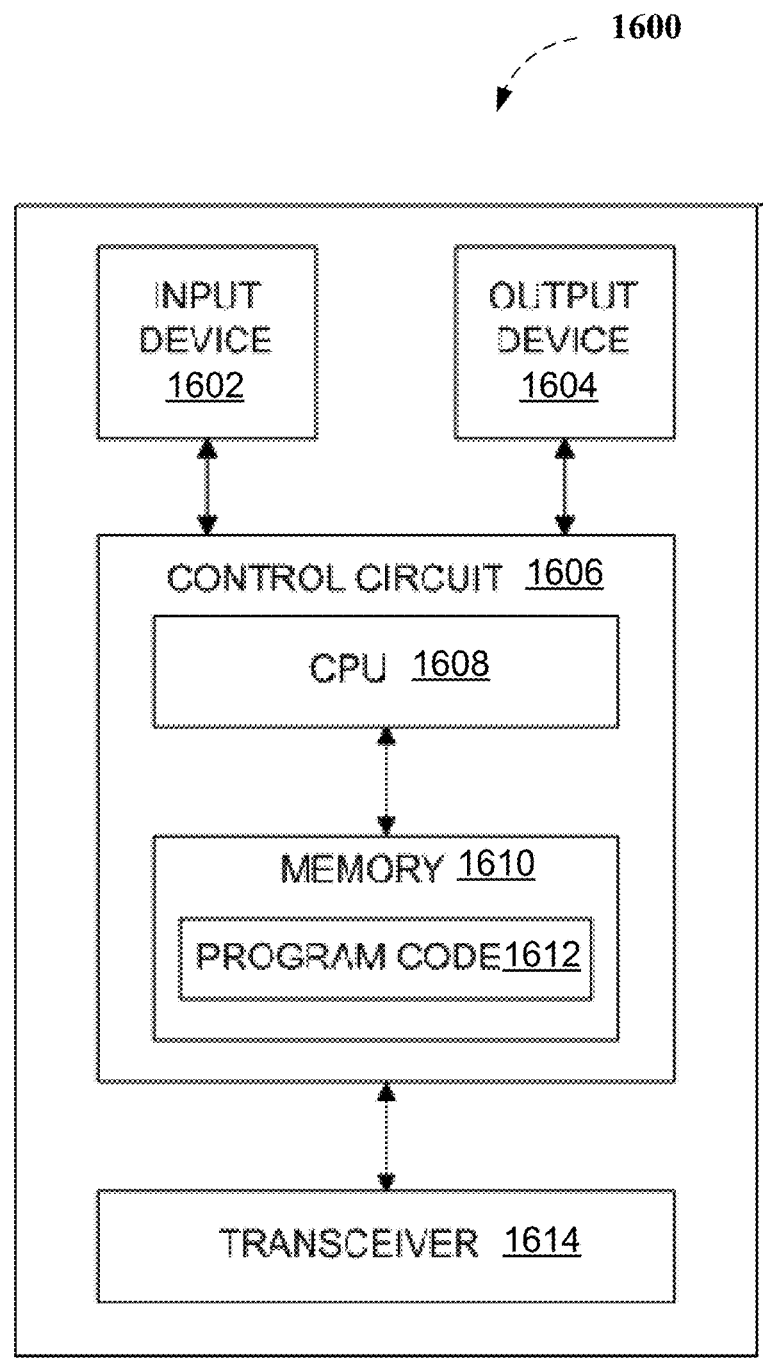
FIG. 16 depicts a simplified functional block diagram of an example non-limiting communication device suitable for incorporation of various aspects of the subject disclosure.

FIG. 16 depicts a simplified functional block diagram of an exemplary non-limiting communication device 1600, such as a UE (e.g., UE configured to perform beam management comprising AT 1316, AT 1322, receiver system 1404, or portions thereof, and/or as further described herein regarding FIGS. 12-16, etc.), a base station (e.g., a base station such as an access network 1302, a transmitter system 1402, and/or portions thereof, configured for beam handling, etc.), etc., suitable for incorporation of various aspects of the subject disclosure. As shown in FIG. 14, exemplary communication device 1400 in a wireless communication system can be utilized for realizing the UEs (or ATs) 1316 and 1322 in FIG. 13, for example, and the wireless communications system such as described above regarding FIG. 13, as a further example, can be the LTE system, the NR system, etc. Exemplary communication device 1600 can comprise an input device 1602, an output device 1604, a control circuit 1606, a central processing unit (CPU) 1608, a memory 1610, a program code 1612, and a transceiver 1614. Exemplary control circuit 1606 can execute the program code 1612 in the memory 1610 through the CPU 1608, thereby controlling an operation of the communications device 1600. Exemplary communications device 1600 can receive signals input by a user through the input device 1602, such as a keyboard or keypad, and can output images and sounds through the output device 1604, such as a monitor or speaker. Exemplary transceiver 1614 can be used to receive and transmit wireless signals, delivering received signals to the control circuit 1606, and outputting signals generated by the control circuit 1606 wirelessly, for example, as described above regarding FIG. 16.

Accordingly, further non-limiting embodiments as described herein can comprise a UE (e.g., UE configured for beam handling and comprising AT 1516, AT 1522, receiver system 1604, or portions thereof, and/or as further described herein regarding FIGS. 10-18, etc.) that can comprise one or more of a exemplary control circuit 1606, a processor (e.g., CPU 1608, etc.) installed in the control circuit (e.g., control circuit 1606), a memory (e.g., memory 1610) installed in the control circuit (e.g., control circuit 1606) and coupled to the processor (e.g., CPU 1608, etc.), wherein the processor (e.g., CPU 1608, etc.) is configured to execute a program code (e.g., program code 1612) stored in the memory (e.g., memory 1610) to perform method steps and/or provide functionality as described herein. As a non-limiting example, exemplary program code (e.g., program code 1612) can comprise computer-executable instructions as described above regarding FIG. 15, portions thereof, and/or complementary or supplementary instructions thereto, in addition to computer-executable instructions configured to achieve functionalities as described herein, regarding FIGS. 1-12, and/or any combinations thereof.

Figure 17:
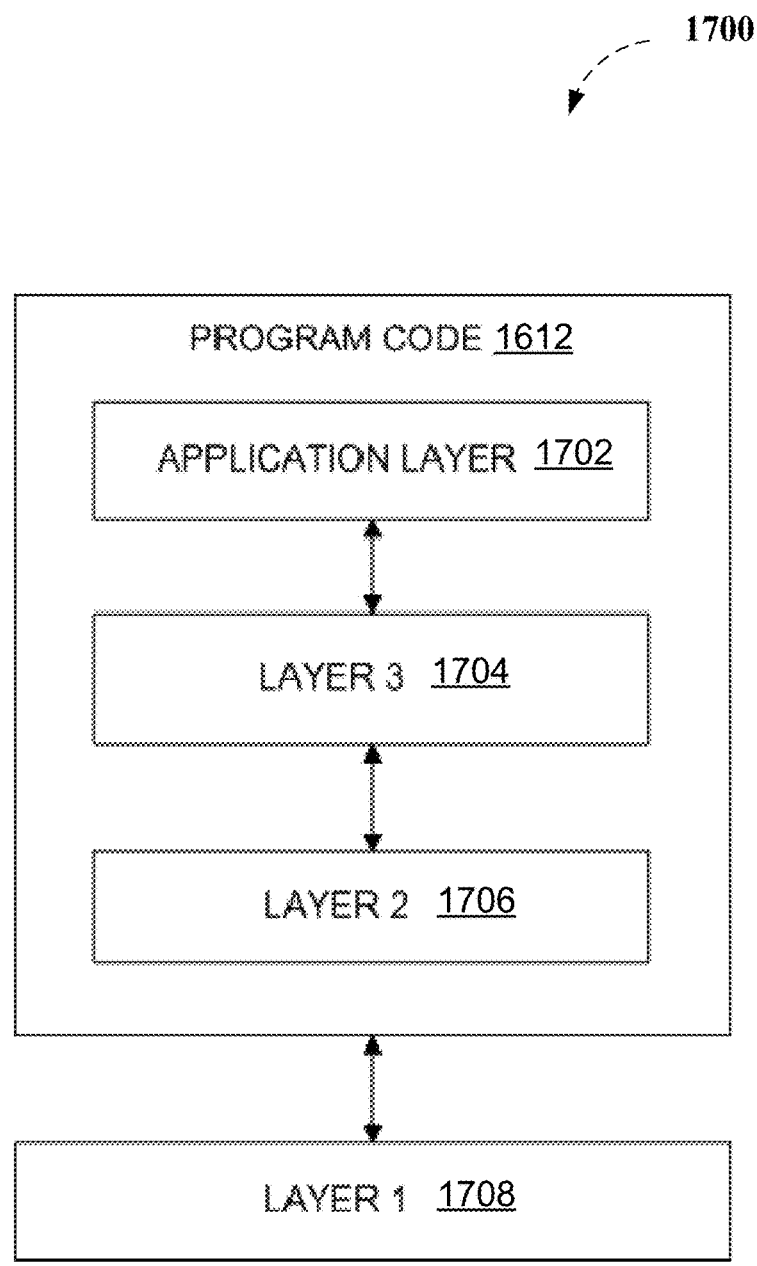
FIG. 17 depicts a simplified block diagram of example program code shown in FIGS. 10-12, suitable for incorporation of various aspects of the subject disclosure.

FIG. 17 depicts a simplified block diagram 1700 of exemplary program code 1612 shown in FIG. 16, suitable for incorporation of various aspects of the subject disclosure. In this embodiment, exemplary program code 1612 can comprise an application layer 1702, a Layer 3 portion 1704, and a Layer 2 portion 1706, and can be coupled to a Layer 1 portion 1708. The Layer 3 portion 1704 generally performs radio resource control. The Layer 2 portion 1706 generally performs link control. The Layer 1 portion 1708 generally performs physical connections. For LTE, LTE-A, or NR system, the Layer 2 portion 1706 may include a Radio Link Control (RLC) layer and a Medium Access Control (MAC) layer. The Layer 3 portion 1704 may include a Radio Resource Control (RRC) layer. In addition, as further described above, exemplary program code (e.g., program code 1612) can comprise computer-executable instructions as described above regarding FIG. 15, portions thereof, and/or complementary or supplementary instructions thereto, in addition to computer-executable instructions configured to achieve functionalities as described herein, regarding FIGS. 1-18, and/or any combinations thereof.

Figure 18:
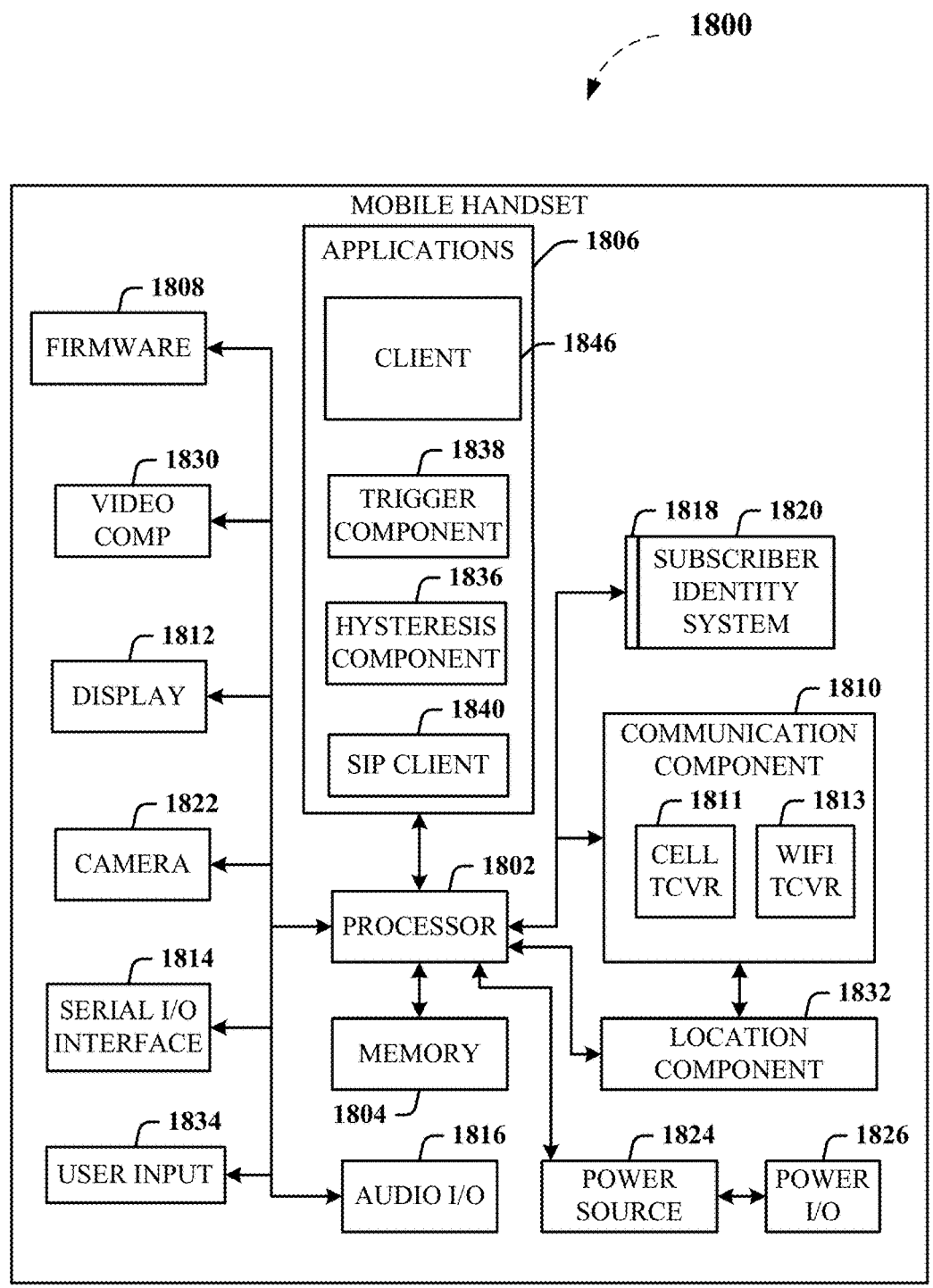
FIG. 18 illustrates a schematic diagram of an example mobile device (e.g. a mobile handset, user device, user equipment, or access terminal) that can facilitate various non-limiting aspects of the disclosed subject matter in accordance with the embodiments described herein.

FIG. 18 depicts a schematic diagram of an example mobile device 1800 (e.g., a mobile handset, UE, AT, etc.) that can facilitate various non-limiting aspects of the disclosed subject matter in accordance with the embodiments described herein. Although mobile handset 1800 is illustrated herein, it will be understood that other devices can be any of a number of other a mobile devices, for instance, and that the mobile handset 1800 is merely illustrated to provide context for the embodiments of the subject matter described herein. The following discussion is intended to provide a brief, general description of an example of a suitable environment 1800 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal, for example, as further described herein. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 1800 can include a processor 1802 for controlling and processing all onboard operations and functions. A memory 1804 interfaces to the processor 1802 for storage of data and one or more applications 1806 (e.g., communications applications such as browsers, apps, etc.). Other applications can support operation of communications and/or financial communications protocols. The applications 1806 can be stored in the memory 1804 and/or in a firmware 1808, and executed by the processor 1802 from either or both the memory 1804 or/and the firmware 1808. The firmware 1808 can also store startup code for execution in initializing the handset 1800. A communications component 1810 interfaces to the processor 1802 to facilitate wired/wireless communication with external systems, e.g., cellular networks, VoIP networks, and so on. Here, the communications component 1810 can also include a suitable cellular transceiver 1811 (e.g., a GSM transceiver, a CDMA transceiver, an LTE transceiver, etc.) and/or an unlicensed transceiver 1813 (e.g., Wireless Fidelity (WiFi™), Worldwide Interoperability for Microwave Access (WiMax®)) for corresponding signal communications, and the like. The handset 1800 can be a device such as a cellular telephone, a personal digital assistant (PDA) with mobile communications capabilities, and messaging-centric devices. The communications component 1810 also facilitates communications reception from terrestrial radio networks (e.g., broadcast), digital satellite radio networks, and Internet-based radio services networks, and so on.

The handset 1800 includes a display 1812 for displaying text, images, video, telephony functions (e.g., a Caller ID function, etc.), setup functions, and for user input. For example, the display 1812 can also be referred to as a "screen" that can accommodate the presentation of multimedia content (e.g., music metadata, messages, wallpaper, graphics, etc.). The display 1812 can also display videos and can facilitate the generation, editing and sharing of video quotes. A serial I/O interface 1814 is provided in communication with the processor 1802 to facilitate wired and/or wireless serial communications (e.g., Universal Serial Bus (USB), and/or Institute of Electrical and Electronics Engineers (IEEE) 1494) through a hardwire connection, and other serial input devices (e.g., a keyboard, keypad, and mouse). This supports updating and troubleshooting the handset 1800, for example. Audio capabilities are provided with an audio I/O component 1816, which can include a speaker for the output of audio signals related to, for example, indication that the user pressed the proper key or key combination to initiate the user feedback signal. The audio I/O component 1816 also facilitates the input of audio signals through a microphone to record data and/or telephony voice data, and for inputting voice signals for telephone conversations.

The handset 1800 can include a slot interface 1818 for accommodating a SIC (Subscriber Identity Component) in the form factor of a card Subscriber Identity Module (SIM) or universal SIM 1820, and interfacing the SIM card 1820 with the processor 1802. However, it is to be appreciated that the SIM card 1820 can be manufactured into the handset 1800, and updated by downloading data and software.

The handset 1800 can process Internet Protocol (IP) data traffic through the communication component 1810 to accommodate IP traffic from an IP network such as, for example, the Internet, a corporate intranet, a home network, a person area network, a cellular network, etc., through an internet service provider (ISP) or broadband cable provider. Thus, VoIP traffic can be utilized by the handset 1800 and IP-based multimedia content can be received in either an encoded or a decoded format.

A video processing component 1822 (e.g., a camera and/or associated hardware, software, etc.) can be provided for decoding encoded multimedia content. The video processing component 1822 can aid in facilitating the generation and/or sharing of video. The handset 1800 also includes a power source 1824 in the form of batteries and/or an alternating current (AC) power subsystem, which power source 1824 can interface to an external power system or charging equipment (not shown) by a power input/output (I/O) component 1826.

The handset 1800 can also include a video component 1830 for processing video content received and, for recording and transmitting video content. For example, the video component 1830 can facilitate the generation, editing and sharing of video. A location-tracking component 1832 facilitates geographically locating the handset 1800. A user input component 1834 facilitates the user inputting data and/or making selections as previously described. The user input component 1834 can also facilitate selecting perspective recipients for fund transfer, entering amounts requested to be transferred, indicating account restrictions and/or limitations, as well as composing messages and other user input tasks as required by the context. The user input component 1834 can include such conventional input device technologies such as a keypad, keyboard, mouse, stylus pen, and/or touch screen, for example.

Referring again to the applications 1806, a hysteresis component 1836 facilitates the analysis and processing of hysteresis data, which is utilized to determine when to associate with an access point. A software trigger component 1838 can be provided that facilitates triggering of the hysteresis component 1838 when a WiFi™ transceiver 1813 detects the beacon of the access point. A Session Initiation Protocol (SIP) client 1840 enables the handset 1800 to support SIP protocols and register the subscriber with the SIP registrar server. The applications 1806 can also include a communications application or client 1846 that, among other possibilities, can facilitate user interface component functionality as described above.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code or program code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the various embodiments of the subject disclosure have been described in connection with various non-limiting aspects, it will be understood that the embodiments of the subject disclosure may be capable of further modifications. This application is intended to cover any variations, uses or adaptation of the subject disclosure following, in general, the principles of the subject disclosure, and including such departures from the present disclosure as come within the known and customary practice within the art to which the subject disclosure pertains.

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "example" and "non-limiting" are used herein to mean serving as an example, instance, or illustration. For the avoidance of doubt, the subject matter disclosed herein is not limited by such examples. Moreover, any aspect or design described herein as "an example," "an illustration," "example" and/or "non-limiting" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the example systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the subject disclosure should not be limited to any single embodiment, but rather should be construed in breadth, spirit and scope in accordance with the appended claims.

What is claimed is:

1. A method for a user equipment (UE), comprising:
   maintaining one or multiple serving beams;
   performing an uplink (UL) transmission of data stored in an uplink hybrid automatic repeat request (UL HARQ) buffer;
   initiating a beam recovery procedure; and
   performing a UL retransmission of the data stored in the UL HARQ buffer after successful completion of the beam recovery procedure, wherein the beam recovery procedure is a random access procedure.

2. The method of claim 1, wherein the beam recovery procedure includes transmitting a scheduling request.

3. The method of claim 1, wherein the beam recovery procedure is initiated in response to a beam tracking failure.

4. The method of claim 3, further comprising: determining that the beam tracking failure is detected if the UE determines that the one or multiple serving beams become invalid.

5. The method of claim 4, wherein the UE determines that the one or multiple serving beams become invalid if the UE does not receive a signal or an indication via the one or multiple serving beams within a defined period of time.

6. The method of claim 4, wherein the UE determines that the one or multiple serving beams become invalid if a timer expires or a counter reaches a defined value.

7. The method of claim 3, wherein the UE prevents flushing of the UL HARQ buffer in response to the beam tracking failure.

8. The method of claim 1, wherein the UE triggers a power headroom report in response to a beam tracking failure or the successful completion of the beam recovery procedure.

9. The method of claim 1, wherein the UL transmission occurs via a beam of the one or multiple serving beams.

10. The method of claim 1, wherein the UL retransmission occurs via a second beam different from the one or multiple serving beams.

11. A user equipment (UE), comprising:
    a control circuit;
    a processor installed in the control circuit; and
    a memory installed in the control circuit and operatively coupled to the processor, wherein the processor is configured to execute a program code stored in the memory to perform resource requesting in a wireless communication system by operations comprising:
    maintaining one or multiple serving beams;
    performing an uplink (UL) transmission of data stored in an uplink hybrid automatic repeat request (UL HARQ) buffer;
    initiating a beam recovery procedure; and
    performing a UL retransmission of the data stored in the UL HARQ buffer after successful completion of the beam recovery procedure, wherein the beam recovery procedure is a random access procedure.

12. The UE of claim 11, wherein the beam recovery procedure includes transmitting a scheduling request.

13. The UE of claim 11, wherein the beam recovery procedure is initiated in response to a beam tracking failure.

14. The UE of claim 13, further comprising: determining that the beam tracking failure is detected if the UE determines that the one or multiple serving beams become invalid.

15. The UE of claim 14, wherein the UE determines that the one or multiple serving beams become invalid if the UE does not receive a signal or an indication via the one or multiple serving beams within a defined period of time.

16. The UE of claim 14, wherein the UE determines that the one or multiple serving beams become invalid if a timer expires or a counter reaches a defined value.

17. The UE of claim 13, wherein the UE prevents flushing of the UL HARQ buffer in response to the beam tracking failure.

18. The UE of claim 11, wherein the UE triggers a power headroom report in response to a beam tracking failure or the successful completion of the beam recovery procedure.

19. The UE of claim 11, wherein the UL transmission occurs via a beam of the one or multiple serving beams.

20. The UE of claim 11, wherein the UL retransmission occurs via a second beam different from the one or multiple serving beams.

* * * * *